(12) United States Patent
Fujishiro et al.

(10) Patent No.: US 10,425,802 B2
(45) Date of Patent: Sep. 24, 2019

(54) RADIO TERMINAL AND BASE STATION

(71) Applicant: KYOCERA Corporation, Kyoto-shi, Kyoto (JP)

(72) Inventors: Masato Fujishiro, Yokohama (JP); Henry Chang, San Diego, CA (US); Chiharu Yamazaki, Ota-ku (JP)

(73) Assignee: Kyocera Corporation, Kyoto (JP)

( * ) Notice: Subject to any disclaimer, the term of this patent is extended or adjusted under 35 U.S.C. 154(b) by 81 days.

(21) Appl. No.: 15/728,119

(22) Filed: Oct. 9, 2017

(65) Prior Publication Data

US 2018/0035279 A1    Feb. 1, 2018

Related U.S. Application Data

(63) Continuation of application No. PCT/JP2016/061431, filed on Apr. 7, 2016.
(Continued)

(51) Int. Cl.
*H04W 8/00* (2009.01)
*H04W 72/04* (2009.01)
(Continued)

(52) U.S. Cl.
CPC ............ *H04W 8/005* (2013.01); *H04W 8/00* (2013.01); *H04W 72/04* (2013.01); *H04W 72/044* (2013.01); *H04W 72/0406* (2013.01); *H04W 92/18* (2013.01); *H04W 24/08* (2013.01); *H04W 84/042* (2013.01); *H04W 88/02* (2013.01); *H04W 92/20* (2013.01)

(58) Field of Classification Search
None
See application file for complete search history.

(56) References Cited

U.S. PATENT DOCUMENTS

| | | |
|---|---|---|
| 2013/0195026 A1 | 8/2013 | Johnsson et al. |
| 2015/0049674 A1 | 2/2015 | Kuo |

(Continued)

FOREIGN PATENT DOCUMENTS

| | | | |
|---|---|---|---|
| JP | 2015-039172 A | 2/2015 | |
| JP | 2015-510333 A | 4/2015 | |

(Continued)

OTHER PUBLICATIONS

Japanese Office Action dated Jan. 23, 2018, issued in Japanese Patent Application No. 2017-511061 by Japanese Patent Office, with Concise Explanation, 7 pages.
(Continued)

*Primary Examiner* — Brian S Roberts

(57) ABSTRACT

A radio terminal according to an embodiment includes a controller configured to perform inter-frequency sidelink discovery transmission of transmitting a sidelink discovery signal at a frequency different from a frequency of a serving cell. The controller is further configured to receive, from the serving cell, a message including resource allocation information and frequency information. The resource allocation information is information indicating radio resources to be used for the inter-frequency sidelink discovery transmission. The frequency information is information indicating the different frequency to which the resource allocation information is applied.

4 Claims, 10 Drawing Sheets

Related U.S. Application Data

(60) Provisional application No. 62/145,829, filed on Apr. 10, 2015, provisional application No. 62/162,204, filed on May 15, 2015, provisional application No. 62/193,708, filed on Jul. 17, 2015, provisional application No. 62/222,865, filed on Sep. 24, 2015.

(51) Int. Cl.
| | | |
|---|---|---|
| *H04W 92/18* | (2009.01) | |
| *H04W 24/08* | (2009.01) | |
| *H04W 84/04* | (2009.01) | |
| *H04W 88/02* | (2009.01) | |
| *H04W 92/20* | (2009.01) | |

(56) References Cited

U.S. PATENT DOCUMENTS

| | | | |
|---|---|---|---|
| 2015/0257184 A1 | 9/2015 | Yamazaki et al. | |
| 2016/0295499 A1* | 10/2016 | Tavildar | H04W 48/12 |
| 2016/0302250 A1* | 10/2016 | Sheng | H04W 4/70 |
| 2017/0134146 A1* | 5/2017 | Chae | H04L 5/0005 |
| 2017/0311344 A1* | 10/2017 | Lee | H04W 56/00 |
| 2018/0070219 A1* | 3/2018 | Khoryaev | H04W 8/005 |

FOREIGN PATENT DOCUMENTS

| | | |
|---|---|---|
| WO | 2014/050556 A1 | 4/2014 |
| WO | 2014/130156 A1 | 8/2014 |

OTHER PUBLICATIONS

3rd Generation Partnership Project, "Technical Specification Group Radio Access Network; Evolved Universal Terrestrial Radio Access (E-UTRA); Radio Resource Control (RRC); Protocol Specification (Release 12)" 3GPP TS 36.331, V12.5.0 (Mar. 2015), 19 pages.

Qualcomm, "Enhanced LTE D2D proximity services: Release 13 D2D WI", 3GPP TSG-RAN #66, RP-141905, Dec. 8, 2014, Maui, USA.

International Search Report (Form PCT/ISA/210) dated Jun. 28, 2016, issued for PCT/JP2016/061431, 12 pages.

* cited by examiner

RADIO TERMINAL AND BASE STATION

RELATED APPLICATION

This application is a continuation application of international application PCT/JP2016/061431, filed Apr. 7, 2016, which claims the benefit of U.S. Provisional Application No. 62/145,829 filed Apr. 10, 2015, U.S. provisional application No. 62/162,204 filed May 15, 2015, U.S. provisional application No. 62/193,708 filed Jul. 17, 2015, and U.S. Provisional Application No. 62/222,865, filed Sep. 24, 2015, the entire contents of which are incorporated herein by reference.

TECHNICAL FIELD

The present disclosure relates to a radio terminal and a base station which are used in a mobile communication system in which a device to device proximity service is supported.

BACKGROUND ART

In 3rd Generation Partnership Project (3GPP) which is a mobile communication system standardization project, standardization of a device to device proximity service (D2D ProSe) is in progress.

Two schemes including "sidelink direct discovery" and "sidelink direct communication" are specified as a scheme for the "D2D ProSe." Here, the sidelink direct discovery is a scheme of searching for a counterpart by directly transmitting a discovery signal (a sidelink signal) not designating a specific destination between radio terminals. The sidelink direct communication is a scheme of designating a specific destination group and directly transmitting data (sidelink signal) between radio terminals.

For the sidelink direct discovery, inter-frequency discovery monitoring is specified. In inter-frequency discovery monitoring, a radio terminal monitors (and receives) the discovery signal at a frequency different from a frequency of a serving cell. On the other hand, inter-frequency discovery transmission (inter-frequency discovery announcing) is not specified, and transmission of the discovery signal is limited to the frequency of the serving cell.

SUMMARY

A radio terminal according to an embodiment includes a controller configured to perform inter-frequency sidelink discovery transmission of transmitting a sidelink discovery signal at a frequency different from a frequency of a serving cell. The controller is further configured to receive, from the serving cell, a message including resource allocation information and frequency information. The resource allocation information is information indicating radio resources to be used for the inter-frequency sidelink discovery transmission. The frequency information is information indicating the different frequency to which the resource allocation information is applied.

The message includes information indicating whether or not the inter-frequency sidelink discovery transmission is permitted for each of a plurality of different frequencies.

A radio terminal according to an embodiment includes a controller configured to perform inter-frequency sidelink discovery transmission of transmitting a sidelink discovery signal at a frequency different from a frequency of a serving cell. The controller is further configured to receive a first system information block including information indicating that the radio terminal searches for the different frequency. The controller is further configured to receive, from a neighbor cell of the different frequency, a second system information block including a sidelink discovery transmission resource pool in response to reception of the first system information block.

The controller may transmit predetermined information based on the second system information block to the serving cell. The predetermined information includes at least one of the sidelink discovery transmission resource pool of the neighbor cell, a cell identifier of the neighbor cell, an identifier of a PLMN to which the neighbor cell belongs, and a transmission gap pattern including a candidate timing at which the inter-frequency sidelink discovery transmission is performed.

A radio terminal according to an embodiment includes a controller configured to perform inter-frequency sidelink discovery transmission of transmitting a sidelink discovery signal at a frequency different from a frequency of a serving cell. The controller is further configured to notify the serving cell of frequency information indicating the different frequency at which the radio terminal intends to perform the inter-frequency sidelink discovery transmission.

A radio terminal according to an embodiment includes a controller configured to perform inter-frequency sidelink discovery transmission of transmitting a sidelink discovery signal at a frequency different from a frequency of a serving cell. The controller is further configured to perform a process of receiving a system information block transmitted at the different frequency. The system information block is a system information block related to sidelink discovery. The controller is further configured to determine whether or not the sidelink discovery signal is permitted at the different frequency on the basis of the system information block.

A radio terminal according to an embodiment is configured to perform inter-frequency sidelink transmission transmitting a sidelink signal at a frequency different from a frequency of a serving cell. The radio terminal includes a controller configured to perform the inter-frequency sidelink transmission in accordance with a control mode selected from among a plurality of control modes which are different in a cell of controlling resource allocation for the inter-frequency sidelink transmission.

A radio terminal according to an embodiment is configured to perform inter-frequency sidelink transmission transmitting a sidelink signal at a frequency different from a frequency of a serving cell. The radio terminal includes a controller configured to notify the serving cell of a detection state of a neighbor cell operated at the different frequency to be subjected to the inter-frequency sidelink transmission.

A radio terminal according to an embodiment is configured to perform inter-frequency sidelink monitoring of monitoring a sidelink signal transmitted at a frequency different from a frequency of a serving cell. The radio terminal includes a controller configured to perform a process of receiving, from the serving cell, a system information block including a sidelink reception resource pool. The controller is further configured to perform the inter-frequency sidelink monitoring using radio resources included in the sidelink reception resource pool.

A radio terminal according to an embodiment includes: an NAS entity configured to perform PLMN selection; and an AS entity configured to perform a PLMN search and notifies the NAS entity of a discovered PLMN. The AS entity is further configured to notify the NAS entity of additional information indicating whether or not the discovered PLMN is available for a device to device proximity service. The NAS entity is further configured to select a PLMN available for the device to device proximity service in accordance with a request from an application or a user on the basis of the additional information.

A radio terminal according to an embodiment includes a controller configured to perform inter-frequency sidelink transmission of transmitting a sidelink signal at a frequency different from a frequency of a serving cell. The controller is further configured to perform a process of receiving information indicating first radio resources allocated by the serving cell for the inter-frequency sidelink transmission, a process of receiving information indicating second radio resources allocated by a non-serving cell for the inter-frequency sidelink transmission, and a process of preferentially selecting either of the first radio resources and the second radio resources as radio resources used for the inter-frequency sidelink transmission in a case in which conflict occurs between the first radio resources and the second radio resources.

DESCRIPTION OF EMBODIMENTS

Overview of Embodiments

Figure 1:
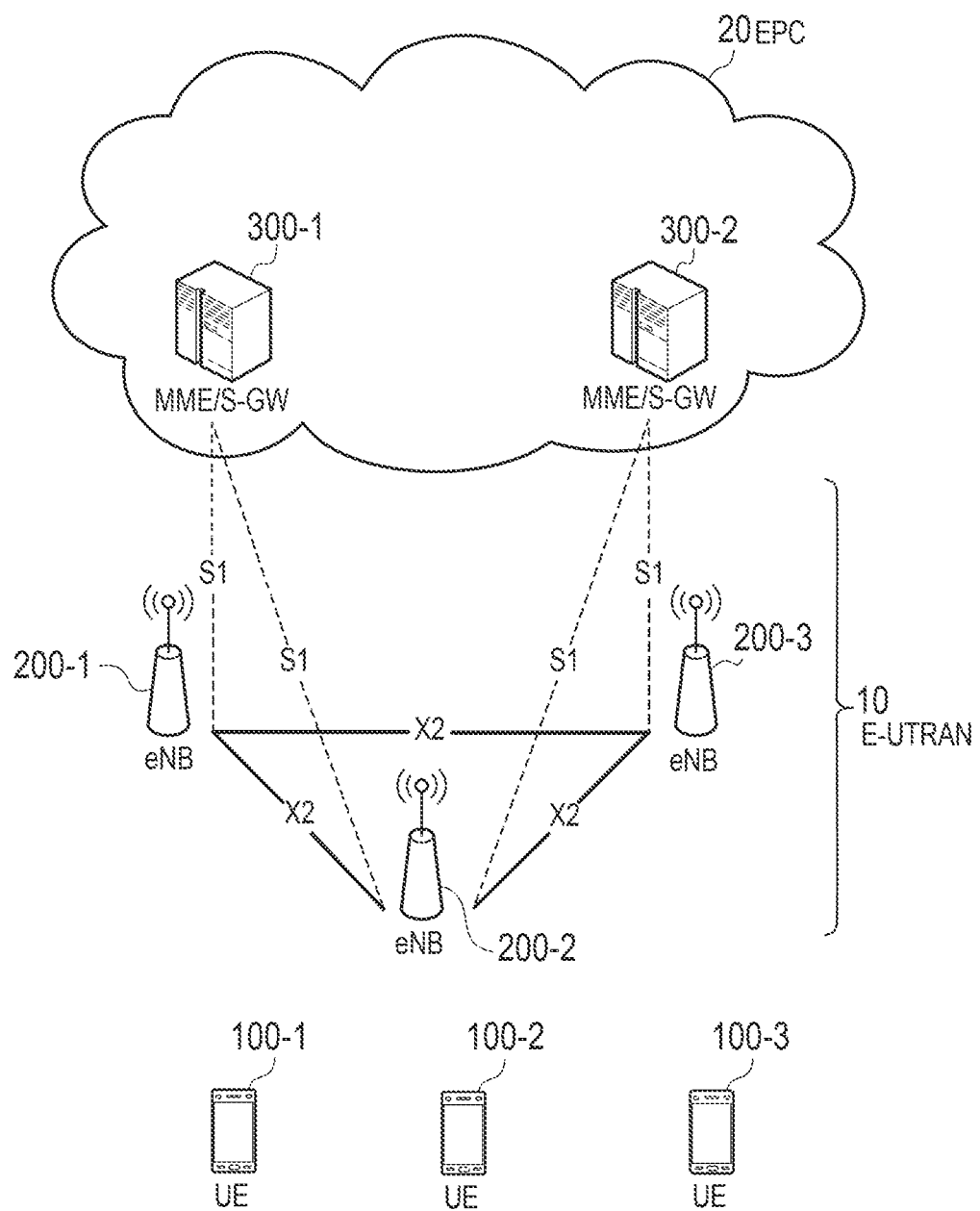
FIG. 1 is a diagram illustrating a configuration of an LTE system.

A radio terminal according to a first embodiment is configured to perform inter-frequency sidelink discovery transmission of transmitting a sidelink discovery signal at a frequency different from a frequency of a serving cell. The radio terminal includes a controller configured to perform the inter-frequency sidelink transmission in accordance with a control mode selected from among a plurality of control modes which are different in a cell of controlling resource allocation for the inter-frequency sidelink transmission.

A radio terminal according to a first embodiment is configured to perform inter-frequency sidelink discovery transmission of transmitting a sidelink discovery signal at a frequency different from a frequency of a serving cell. The radio terminal includes a controller configured to notify the serving cell of frequency information indicating the different frequency at which the radio terminal intends to perform the inter-frequency sidelink discovery transmission.

A radio terminal according to a first embodiment includes a controller configured to perform inter-frequency sidelink discovery transmission of transmitting a sidelink discovery signal at a frequency different from a frequency of a serving cell. The controller is further configured to perform a process of receiving a system information block transmitted at the different frequency. The system information block is a system information block related to sidelink discovery. The controller is further configured to determine whether or not the sidelink discovery signal is permitted at the different frequency on the basis of the system information block.

A radio terminal according to a first embodiment is configured to perform inter-frequency sidelink transmission transmitting a sidelink signal at a frequency different from a frequency of a serving cell. The radio terminal includes a controller configured to perform the inter-frequency sidelink transmission in accordance with a control mode selected from among a plurality of control modes which are different in a cell of controlling resource allocation for the inter-frequency sidelink transmission.

A radio terminal according to a second embodiment is configured to perform inter-frequency sidelink transmission transmitting a sidelink signal at a frequency different from a frequency of a serving cell. The radio terminal includes a controller configured to notify the serving cell of a detection state of a neighbor cell operated at the different frequency to be subjected to the inter-frequency sidelink transmission.

A radio terminal according to a third embodiment includes: an NAS entity configured to perform PLMN selection; and an AS entity configured to perform a PLMN search and notifies the NAS entity of a discovered PLMN. The AS entity is further configured to notify the NAS entity of additional information indicating whether or not the discovered PLMN is available for a device to device proximity service. The NAS entity is further configured to select a PLMN available for the device to device proximity service in accordance with a request from an application or a user on the basis of the additional information.

A base station according to a fourth embodiment is configured to manage a serving cell in which a radio terminal performing inter-frequency sidelink transmission exists. The base station includes a controller configured to acquire access restriction information related to a neighbor cell operated at a frequency to be subjected to the inter-frequency sidelink transmission. The controller is further configured to perform control such that the radio terminal does not perform the inter-frequency sidelink transmission in the neighbor cell in a case in which access restriction is applied to the neighbor cell.

A radio terminal configured to perform inter-frequency sidelink transmission transmitting a sidelink signal at a frequency different from a frequency of a serving cell. The radio terminal includes a controller configured to control not to perform the inter-frequency sidelink transmission in the neighbor cell in a case in which access restriction is applied to the neighbor cell.

A radio terminal according to a fifth embodiment includes a controller configured to perform inter-frequency sidelink transmission of transmitting a sidelink signal at a frequency different from a frequency of a serving cell. The controller is further configured to perform a process of receiving information indicating first radio resources allocated by the serving cell for the inter-frequency sidelink transmission, a process of receiving information indicating second radio resources allocated by a non-serving cell for the inter-frequency sidelink transmission, and a process of preferentially selecting either of the first radio resources and the second radio resources as radio resources used for the inter-frequency sidelink transmission in a case in which conflict occurs between the first radio resources and the second radio resources.

[Overview of Mobile Communication System]

An overview of an LTE system which is a mobile communication system according to embodiments will be described below.

(1) Configuration of Mobile Communication System

FIG. 1 is a diagram illustrating a configuration of an LTE system. The LTE system includes a user equipment (UE) 100, an evolved-UMTS terrestrial radio access network (E-UTRAN) 10, and an evolved packet core (EPC) 20 as illustrated in FIG. 1.

The UE 100 corresponds to a radio terminal. The UE 100 is a mobile communication apparatus and performs radio communication with a cell (a serving cell). A configuration of the UE 100 will be described later.

The E-UTRAN 10 corresponds to a radio access network. The E-UTRAN 10 includes an evolved Node-B (eNB) 200. The eNB 200 corresponds to a base station. The eNBs 200 are connected to each other via an X2 interface. A configuration of the eNB 200 will be described later.

The eNB 200 manages one or more cells and performs radio communication with the UE 100 that has established a connection with a cell thereof. The eNB 200 has a radio resource management (RRM) function, a user data routing function (hereinafter referred to simply as "data"), a measurement control function for mobility control/scheduling, and the like. In addition to a term indicating a minimum unit of a radio communication area, "cell" is also used as a term indicating a function performing radio communication with the UE 100.

The EPC 20 corresponds to a core network. The EPC 20 includes a mobility management entity (MME)/serving-gateway (S-GW) 300. The MME performs various kinds of mobility control or the like on the UE 100. The S-GW performs data transfer control. The MME/S-GW 300 is connected to the eNB 200 via an S1 interface. The E-UTRAN 10 and the EPC 20 constitute a network.

(2) Configuration of Radio Interface

Figure 2:
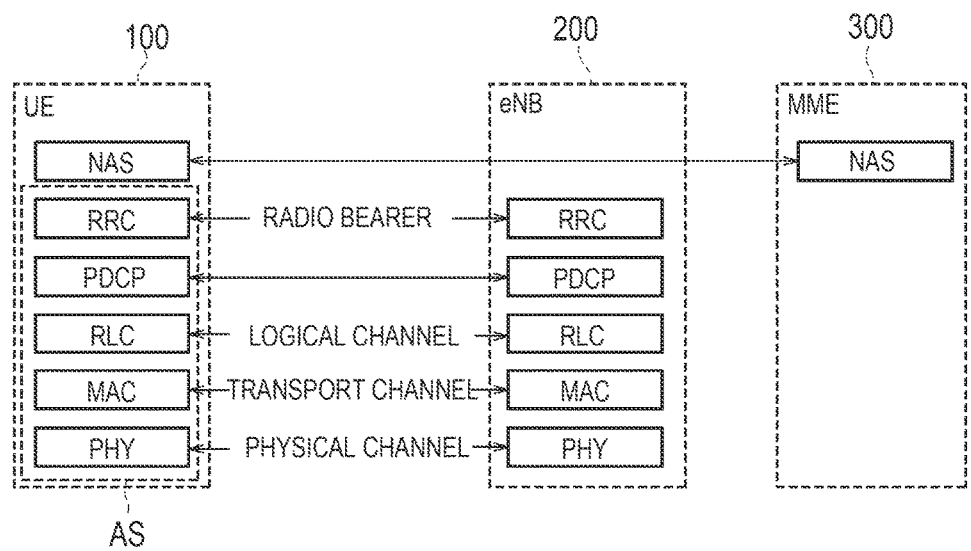
FIG. 2 is a protocol stack diagram of a radio interface in an LTE system.

FIG. 2 is a protocol stack diagram of a radio interface in the LTE system. As illustrated in FIG. 2, the radio interface protocol is divided into first to third layers of an OSI reference model, and the first layer is a physical (PHY) layer. The second layer includes a medium access control (MAC) layer, a radio link control (RLC) layer, and a packet data convergence protocol (PDCP) layer. The third layer includes a radio resource control (RRC) layer.

The physical layer performs encoding/decoding, modulation/demodulation, antenna mapping/demapping, and resource mapping/demapping. Data and a control signal are transmitted between the physical layer of the UE 100 and the physical layer of the eNB 200 via the physical channel.

The MAC layer performs priority control of data, a retransmission process by hybrid ARQ (HARQ), a random access procedure, and the like. Data and a control signal are transmitted between the MAC layer of the UE 100 and the MAC layer of the eNB 200 via the transport channel. The MAC layer of the eNB 200 includes a scheduler that decides uplink and downlink transport formats (a transport block size and a modulation and coding scheme (MCS)) and an allocated resource block for the UE 100.

The RLC layer transmits data to the RLC layer on a reception side using the functions of the MAC layer and the physical layer. Data and a control signal are transmitted between the RLC layer of the UE 100 and the RLC layer of the eNB 200 via a logical channel.

The PDCP layer performs header compression/decompression and encryption/decryption.

The RRC layer is defined only on a control plane for dealing with a control signal. A message (RRC message) for various kinds of settings is transmitted between the RRC layer of the UE 100 and the RRC layer of the eNB 200. The RRC layer controls logical channels, transport channels, and physical channels in accordance with establishment, re-establishment, and release of a radio bearer. When there is a connection (RRC connection) between the RRC of the UE 100 and the RRC of the eNB 200, the UE 100 is in an RRC connected state, and otherwise, the UE 100 is in an RRC idle state.

A non-access stratum (NAS) layer located above the RRC layer performs session management, mobility management, and the like.

The physical layer, the MAC layer, the RLC layer, the PDCP layer, and the RRC layer constitute an access stratum (AS) entity. The NAS layer constitutes a NAS entity.

(3) Configuration of Radio Frame

Figure 3:
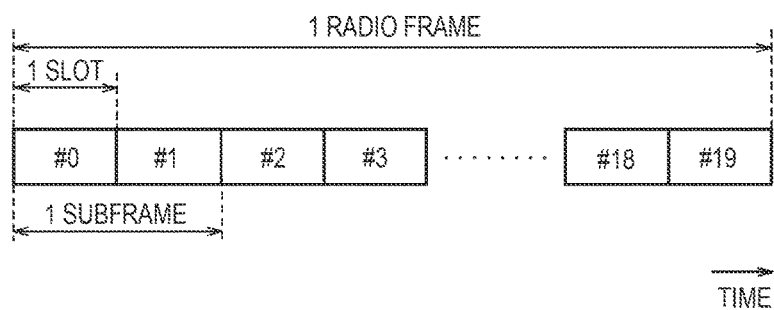
FIG. 3 is a configuration diagram of a radio frame used in an LTE system.

FIG. 3 is a configuration diagram of a radio frame used in the LTE system. In the LTE system, orthogonal frequency division multiple access (OFDMA) is applied to downlink, and Single Carrier Frequency Division Multiple Access (SC-FDMA) is applied to uplink.

As illustrated in FIG. 3, the radio frame includes ten subframes arranged in a time direction. Each subframe includes two slots arranged in the time direction. A length of each subframe is 1 ms, and a length of each slot is 0.5 ms. Each subframe includes a plurality of resource blocks (RB) in a frequency direction and includes a plurality of symbols in a time direction. Each resource block includes a plurality of subcarriers in the frequency direction. One symbol and one subcarrier constitute one resource element (RE). Among the radio resources (time/frequency resources) allocated to the UE 100, frequency resources can be specified by resource blocks, and time resources can be specified by subframes (or slots).

In the downlink, an interval of first few symbols of each subframe is a region used mainly as a physical downlink control channel (PDCCH) for transmitting a downlink control signal. The PDCCH will be described later in detail. The remaining parts of each subframe is a region that can be mainly used as a physical downlink shared channel (PDSCH) for transmitting downlink data.

In the uplink, both end portions of each subframe in the frequency direction are regions used mainly as a physical uplink control channel (PUCCH) for transmitting an uplink control signal. The remaining parts of each subframe are a region that can be used mainly as a physical uplink shared channel (PUSCH) for transmitting uplink data.

(4) Configuration of Radio Terminal

Figure 4:
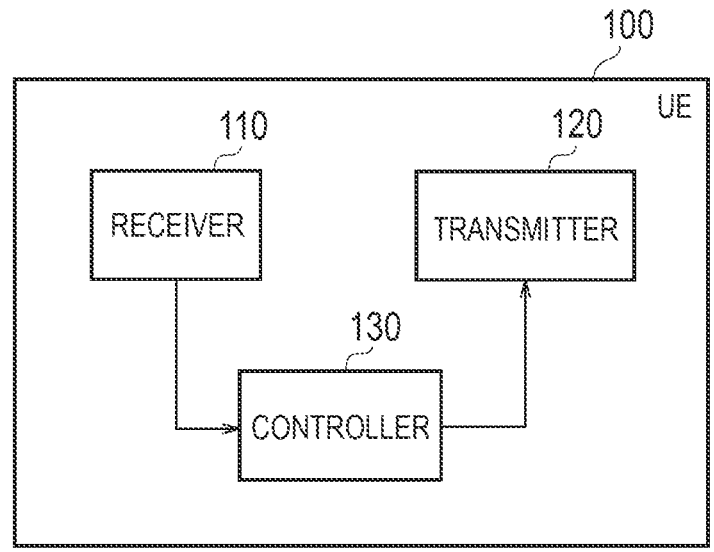
FIG. 4 is a block diagram of a UE (radio terminal).

FIG. 4 is a block diagram of the UE 100 (radio terminal). The UE 100 includes a receiver 110, a transmitter 120, and a controller 130 as illustrated in FIG. 4.

The receiver 110 performs various kinds of receptions under the control of the controller 130. The receiver 110 includes an antenna and a receiving device. The receiving device converts a radio signal received through the antenna into a baseband signal (reception signal) and outputs the baseband signal to the controller 130. The receiver 110 may include a plurality of receivers.

The transmitter 120 performs various kinds of transmissions under the control of the controller 130. The transmitter 120 includes an antenna and a transmitting device. The transmitting device converts a baseband signal (transmission signal) output from the controller 130 into a radio signal and transmits the radio signal from the antenna. The transmitter 120 may include a plurality of transmitters.

The controller 130 controls various kinds of control in the UE 100. The controller 130 includes a processor and a memory. The memory stores a program executed by a processor and information used for processes performed by the processor. The processor includes a baseband processor that performs modulation/demodulation, encoding/decoding, and the like of the baseband signal and a central processing unit (CPU) that executes a program stored in the memory and performs various kinds of processes. The processor may include a codec that encodes and decodes audio/video signals. The processor executes various kinds of communication protocols described above and processes to be described later.

The UE 100 may include a user interface. The user interface is an interface with the user who owns the UE 100, and includes, for example, a display, a microphone, a speaker, various kinds of buttons, or the like.

(5) Configuration of Base Station

Figure 5:
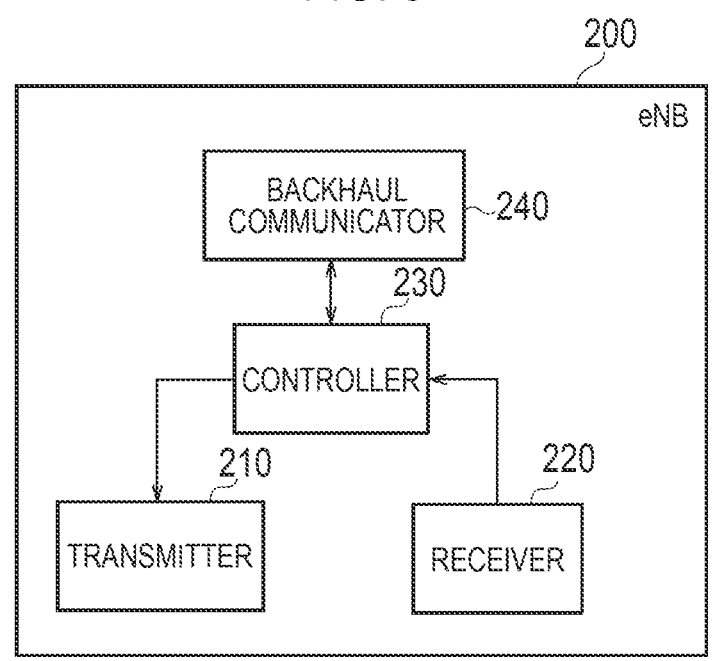
FIG. 5 is a block diagram of an eNB (base station).

FIG. 5 is a block diagram of the eNB 200 (base station). The eNB 200 includes a transmitter 210, a receiver 220, a controller 230, and a backhaul communicator 240 as illustrated in FIG. 5.

The transmitter 210 transmits various kinds of transmissions under the control of the controller 230. The transmitter 210 includes an antenna and a transmitting device. The transmitting device converts a baseband signal (a transmission signal) output from the controller 230 into a radio signal and transmits the radio signal from the antenna.

The receiver 220 receives various kinds of receptions under the control of the controller 230. The receiver 220 includes an antenna and a receiving device. The receiving device converts a radio signal received by the antenna into a baseband signal (reception signal) and outputs the baseband signal to the controller 230.

The controller 230 controls various kinds of controls in the eNB 200. The controller 230 includes a processor and a memory. The memory stores a program executed by a processor and information used for processes performed by the processor. The processor includes a baseband processor that performs modulation/demodulation, encoding/decoding, and the like of the baseband signal and a central processing unit (CPU) that executes a program stored in the memory and performs various kinds of processes. The processor executes various kinds of communication protocols described above and processes to be described later.

The backhaul communicator 240 is connected to the neighbor eNB 200 via the X2 interface and connected to the MME/S-GW 300 via the S1 interface. The backhaul communicator 240 is used for communication performed via the X2 interface, communication to be performed via the S1 interface, and the like.

[Device to Device Proximity Service Overview]

An overview of the device to device proximity service (D2D ProSe) will be described below.

In the "D2D ProSe", a plurality of UEs 100 perform transmission and reception of radio signals via a direct radio link without going through the eNB 200. The direct radio link is referred to as a "sidelink." The two schemes including the "sidelink direct discovery" and the "sidelink direct communication" are specified as the scheme of the "D2D ProSe."

(1) Sidelink Direct Discovery

The sidelink direct discovery is a scheme of informing of the existence of a UE itself by directly transmitting the discovery signal (sidelink signal) not designating a specific destination between UEs. In other words, the sidelink direct discovery is a scheme of searching for a counterpart by directly transmitting a request discovery signal including information about a specific counterpart, an application, or the like and a response discovery signal including information about the request discovery signal between UEs. The sidelink direct discovery can be mainly used within a cell coverage. As a type of sidelink direct discovery, there are a "type 1" in which radio resource candidates for the sidelink direct discovery are designated from eNB 200, and the UE 100 is able to select radio resources among the radio resource candidates and a "type 2 (type 2B)" in which the eNB 200 designates radio resources for the sidelink direct discovery.

Figure 6:
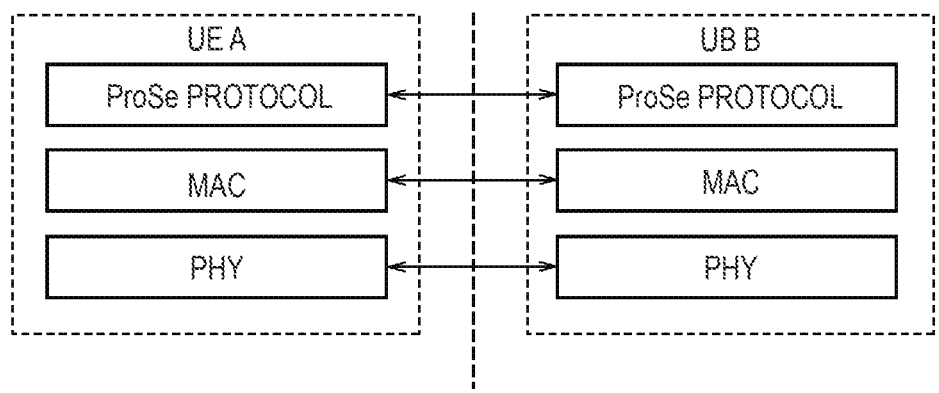
FIG. 6 is a protocol stack diagram of sidelink direct discovery.

FIG. 6 is a protocol stack diagram of sidelink direct discovery. A "sidelink direct discovery" protocol stack includes a physical (PHY) layer, a MAC layer, and a ProSe protocol as illustrated in FIG. 6. The discovery signal is transmitted between the physical layer of the UE (A) and the physical layer of the UE (B) via a physical channel called a physical sidelink discovery channel (PSDCH). The discovery signal is transmitted between the MAC layer of the UE (A) and the MAC layer of the UE (B) via a transport channel called a sidelink discovery channel (SL-DCH).

(2) Sidelink Direct Communication

Figure 7:
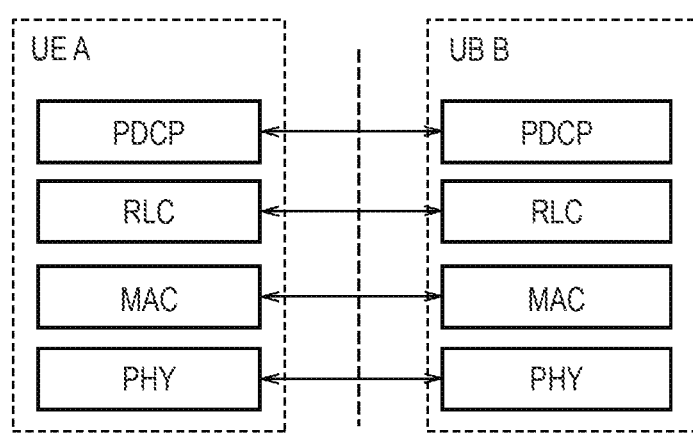
FIG. 7 is a protocol stack diagram of sidelink direct communication.

The sidelink direct communication is a scheme of designating a specific destination (destination group) and directly transmitting data between UEs. FIG. 7 is a protocol stack diagram of the sidelink direct communication. The sidelink direct communication protocol stack includes a physical (PHY) layer, a MAC layer, an RLC layer, and a PDCP layer as illustrated in FIG. 7.

Between the physical layer of the UE (A) and the physical layer of the UE (B), a control signal is transmitted via the physical sidelink control channel (PSCCH), and data is transmitted via a physical sidelink shared channel (PSSCH). Further, a synchronization signal or the like may be transmitted via a physical sidelink broadcast channel (PSBCH). Data is transmitted between the MAC layer of the UE (A) and the MAC layer of the UE (B) via a transport channel called a sidelink shared channel (SL-SCH). Data is transmitted between the RLC layer of the UE (A) and the RLC layer of the UE (B) via a logical channel called a sidelink traffic channel (STCH).

First Embodiment

A first embodiment will be described below. The first embodiment is an embodiment related to the sidelink direct discovery (particularly, the inter-frequency discovery transmission).

Figure 8:
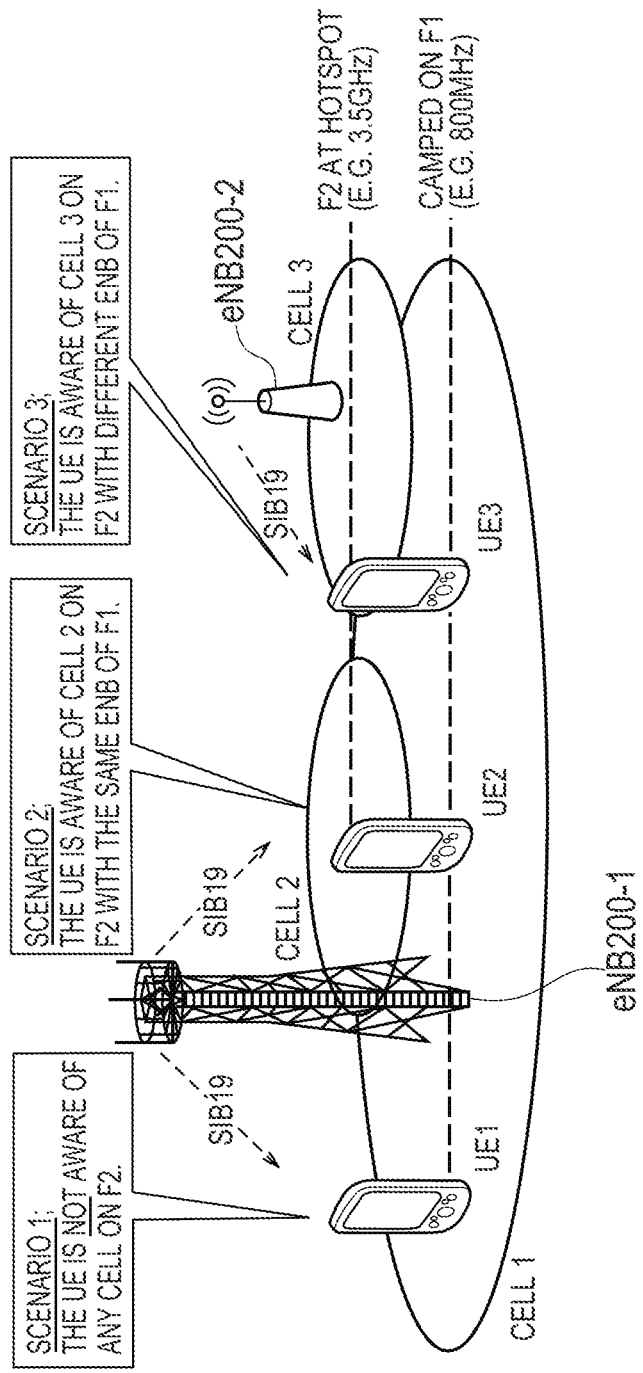
FIG. 8 is a diagram illustrating anticipated scenarios according to a first embodiment.

FIG. 8 is a diagram illustrating anticipated scenarios according to the first embodiment.

A UE 100 (UE 1) to a UE 100 (UE 3) are in an RRC idle mode or an RRC connected mode in a cell (Cell 1) operated at a frequency F1 (for example, an 800 MHz band) as illustrated in FIG. 8. The RRC idle mode may be described as "camping on the cell (Cell 1)." The RRC connected mode may be described as "being connected to the cell (Cell 1)."

The UE 100 (UE 1) to the UE 100 (UE 3) perform the discovery transmission (inter-frequency discovery transmission) at a frequency F2 (for example, a 3.5 GHz band) different from the frequency F1.

Here, the UE 100 (UE 1) does not detect the coverage of the cell at the frequency F2. This scenario is hereinafter referred to as a "scenario 1."

The UE 100 (UE 2) detects the coverage of a cell (Cell 2) managed by the same base station (eNB 200-1) as the serving cell (Cell 1) at the frequency F2. This scenario is hereinafter referred to as a "scenario 2."

The UE 100 (UE 3) detects the coverage of a cell (Cell 3) managed by a base station (eNB 200-2) different from the serving cell (Cell 1) at the frequency F2. This scenario is hereinafter referred to as a "scenario 3."

The UE 100 according to the first embodiment performs the inter-frequency discovery transmission in accordance with a control mode selected from among a plurality of control modes which are different in a cell of controlling a resource allocation for the inter-frequency discovery transmission.

A plurality of control modes include a first control mode in which the resource allocation is controlled by the serving cell (Cell 1) and a second control mode in which the resource allocation is controlled by a neighbor cell (Cell 2 or Cell 3) operated at a different frequency.

In the first embodiment, the UE 100 selects either the first control mode or the second control mode on the basis of a detection state of the coverage of the neighbor cell.

(1) Scenario 1

In a case in which the coverage of the neighbor cell operated at a different frequency is determined not to be detected, the UE 100 (UE 1) selects the first control mode. In this case, the UE 100 notifies the serving cell of the detection state of the neighbor cell operated at a different frequency which is an inter-frequency discovery transmission target. Further, the UE 100 receives a message including resource allocation information and frequency information from the serving cell. The resource allocation information is information indicating radio resources to be used for the inter-frequency discovery transmission. The frequency information is information indicating a different frequency to which the resource allocation information is applied. Then, UE 100 (UE 1) performs the inter-frequency discovery transmission using the radio resources indicated by the resource allocation information.

Figure 9:
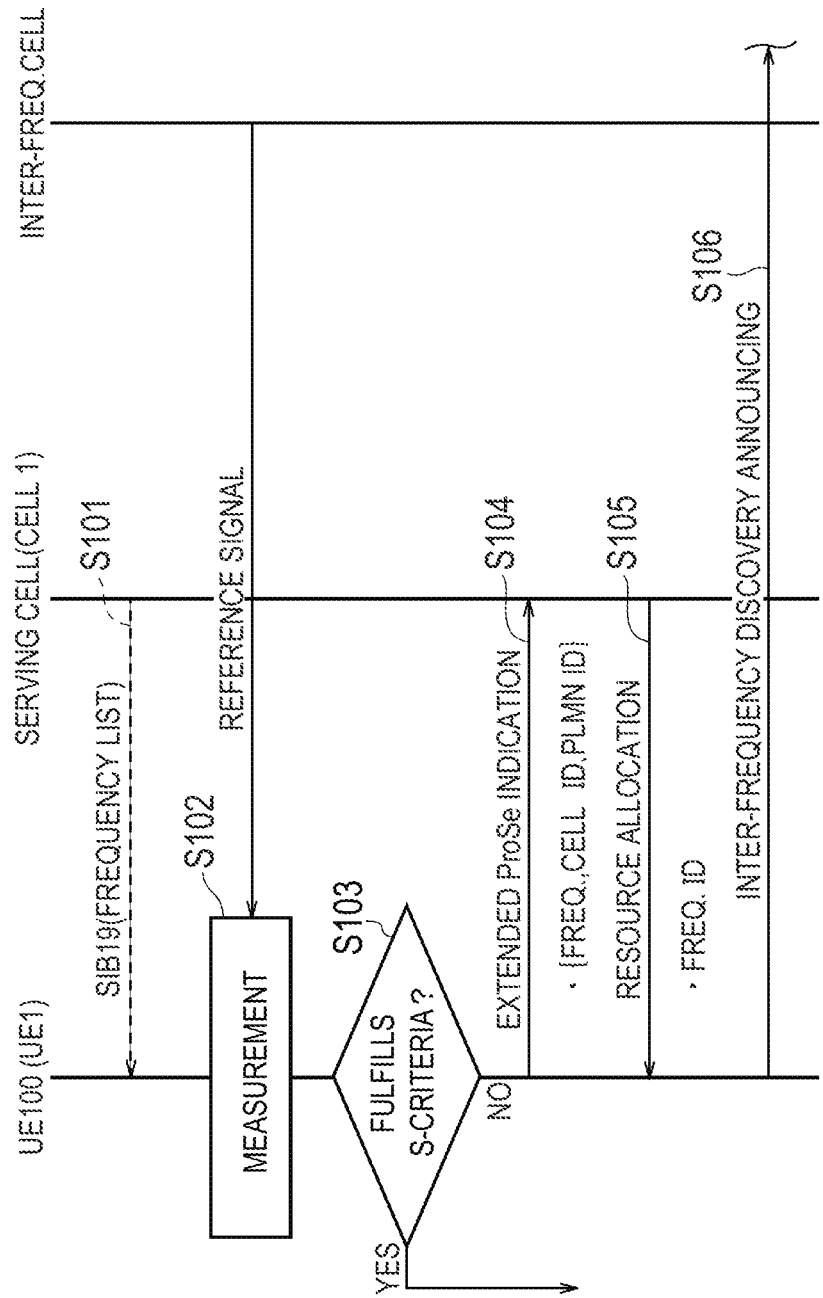
FIG. 9 is a diagram illustrating an example of an operation (first control mode) related to a scenario 1 of the first embodiment.

FIG. 9 is a diagram illustrating an example of an operation (first control mode) related to the scenario 1 of the first embodiment.

In step S101, the UE 100 (UE 1) receives a system information block (a system information block type 19 (SIB 19)) from the serving cell (Cell 1) as illustrated in FIG. 9. The SIB 19 is broadcast information including various kinds of parameters related to the sidelink direct discovery. The SIB 19 includes a discovery reception resource pool (discRxPool) configured with radio resources allocated for discovery monitoring, a discovery transmission resource pool (discTxPool) configured with radio resources allocated for discovery transmission, and a list of different frequencies (discInterFreqList) to be subject to the inter-frequency discovery monitoring.

In addition to these information elements, the SIB 19 may include the following information elements. The following information elements may be provided per resource pool or frequency.

"Offloading Preference" Information

In a case in which this information is received, the UE 100 searches for a different frequency and determines whether or not the cell is able to be detected.

Permission Information for Inter-Frequency (or Inter PLMN) Discovery Transmission Information This information is mainly used in the second control mode. The UE 100 performs the discovery transmission only at the permitted frequency or resource pool.

In step S102, the UE 100 (UE 1) measures a reference signal transmitted from the neighbor cell operated at a different frequency. Here, the UE 100 (UE 1) may search for a frequency (different frequency) included in "discInterFreqList" and perform the measurement. Alternatively, the UE 100 (UE 1) may perform a full frequency search. Alternatively, the UE 100 (UE 1) may search for a frequency at which the discovery has been performed previously.

In step S103, the UE 100 (UE 1) determines whether or not a measurement result in step S102 satisfies predetermined criteria (S-criteria). Here, the "S-criteria" is criteria used in cell reselection. Specifically, it is judged whether the neighbor cell satisfies a relation of $Squal > Thresh_{X,HighQ}$ over a predetermined period ($Treselection_{RAT}$) or a relation of $Srxlev > Thresh_{X,HighP}$ over a predetermined period ($Treselection_{RAT}$). However, Squal indicates a cell selection quality level and is calculated by $Squal = Q_{qualmeas} - (Q_{qualmin} + Q_{qualminoffset}) - Qoffset_{temp}$. $Q_{qualmeas}$ indicates a quality level (RSRQ) of the neighbor cell $Q_{qualmin}$ indicates a minimum required quality level $Q_{qualminoffset}$ indicates a predetermined offset which is constantly applied to the neighbor cell, and $Qoffset_{temp}$ indicates an offset which is temporarily applied to the neighbor cell. $Thresh_{X,HighQ}$ indicates a predetermined threshold value. Further, Srxlev indicates a cell selection reception level and is calculated by $Srxlev = Q_{rxlevmeas} - (Q_{rxlevmin} + Q_{rxlevminoffset}) - Pcompensation - Qoffset_{temp}$. $Q_{rxlevmeas}$ indicates a reception level (RSRP) of the neighbor cell, $Q_{rxlevmin}$ indicates a minimum request reception level, $Q_{rxlevminoffset}$ indicates a predetermined offset which is constantly applied to the neighbor cell, Pcompensation is a parameter related to an uplink capability, and $Qoffset_{temp}$ indicates an offset which is temporarily applied to the neighbor cell. $Thresh_{X,HighP}$ indicates a predetermined threshold value.

In a case in which the measurement result in step S102 satisfies the predetermined criteria (S-criteria) (YES in step S103), the UE 100 (UE1) determines that the coverage of the neighbor cell operated at a different frequency is detected. In this case, an operation according to the scenario 2 to be described later is performed.

On the other hand, when the measurement result in step S102 does not satisfy the predetermined criteria (S-criteria) (NO in step S103), the UE 100 (UE 1) determines that the coverage of the neighbor cell operated at a different frequency is not detected, and the process proceeds to step S104.

The determination criteria for the coverage detection determination is not limited to the "S-criteria." For example, the UE 100 (UE 1) may determine whether or not the system information (MIB, SIB 1, SIB 2, SIB 19, or the like) can be acquired from the neighbor cell operated at a different frequency as the determination criteria. Alternatively, the determination may be performed on the basis of an event type in a case in which an event trigger type measurement report (Measurement Reporting) is set. In this case, the eNB 200 (the serving cell) may perform the coverage detection determination.

In step S104, the UE 100 (UE 1) transmits a message (Extended ProSe Indication) including information indicating a different frequency (target frequency) to be subjected to the inter-frequency discovery transmission to the serving cell. The "Extended ProSe Indication" is a sort of RRC message.

The information indicating the different frequency (target frequency) is, for example, an E-UTRAN absolute radio frequency channel number (EARFCN) which is a frequency identifier (Freq. ID). Here, the "target frequency" is a frequency at which the coverage of the neighbor cell is detected in steps S102 and S103. Alternatively, in a case in which the coverage of the neighbor cell is not detected, the "target frequency" may be a frequency in which the UE 100 (UE 1) has an interest. In a case in which the coverage of the neighbor cell is not detected, the UE 100 (UE 1) may include information indicating that the coverage of the neighbor cell is not detected in "Extended ProSe Indication." Further, the UE 100 (UE 1) may include a cell ID of the neighbor cell whose coverage is detected and an ID of a public land mobile network (PLMN) to which the neighbor cell belongs in "Extended ProSe Indication."

The serving cell (eNB 200-1) determines a frequency whose radio resources are allocated to the UE 100 (UE 1) on the basis of "Extended ProSe Indication."

In step S105, the serving cell (eNB 200-1) transmits a message including the resource allocation information and the frequency information to the UE 100 (UE 1). In the case of the type 2 discovery, the message is, for example, "RRC Connection Reconfiguration" for the discovery resource allocation. The resource allocation information is information (DiscConfig) indicating radio resources to be used for the inter-frequency discovery transmission. The frequency information is information (Freq. ID) indicating a different frequency to which the resource allocation information is applied. In the case of the type 1 discovery, the message including the resource allocation information and the frequency information may be the SIB 19.

If the discovery reception is considered, the serving cell (eNB 200-1) may also include resource allocation information of reception resources of a different frequency in the message as well. In this case, similarly, corresponding frequency information is included in the message.

In step S106, the UE 100 (UE 1) performs the inter-frequency discovery transmission using the radio resources indicated by the resource allocation information at the frequency indicated by the frequency information on the basis of the message received in step S105.

(2) Scenario 2

In a case in which the coverage of the neighbor cell operated at a different frequency is detected, and the serving cell and the neighbor cell are determined to be managed by the same eNB 200, the UE 100 (UE 2) selects the first control mode or the second control mode.

For example, in a case in which the neighbor cell is set as a secondary cell (SCell) of carrier aggregation, the first control mode (controlled from the Cell 1) may be selected, and in a case in which the neighbor cell is not set as the SCell, the second control mode (controlled from the Cell 2) may be selected. Alternatively, in a case in which the Cell 1 (and the UE 100) has transmission GAP (sidelink gap) information, the first control mode may be selected, and in a case in which the Cell 1 (and the UE 100) does not have the transmission GAP (sidelink gap) information, the second control mode may be selected.

The UE 100 (UE 2) is able to determine the eNB 200 which manages each cell on the basis of an eNB ID such as an E-UTRAN cell global ID (ECGI) included in the SIB transmitted by each cell. Alternatively, in a case in which the serving cell performs the determination, if the UE 100 gives a notification indicating the cell ID to the serving cell, the serving cell is able to determine the eNB 200 which manages each cell.

Here, in a case in which the UE 100 (UE 2) selects the first control mode, an operation similar to the operation according to the scenario 1 described above is performed. However, in a case in the UE 100 (UE 2) selects the first control mode in the scenario 2, it is preferable to disable the type 1 discovery and use the type 2 discovery in order to prevent interference.

On the other hand, in a case in which the UE 100 (UE 2) selects the second control mode, an operation similar to an operation according to a scenario 3 to be described later is performed.

(3) Scenario 3

The UE 100 (UE 3) selects the second control mode in a case in which the coverage of the neighbor cell operated at a different frequency is detected and the serving cell and the neighbor cell are determined to be managed by different eNBs 200. In this case, the UE 100 (UE 3) receives the system information block (SIB 19) including the discovery transmission resource pool (discTxPool) from the neighbor cell. Then, the UE 100 performs the inter-frequency discovery transmission (that is, the type 1 discovery) using the radio resources included in the discovery transmission resource pool (discTxPool).

Figure 10:
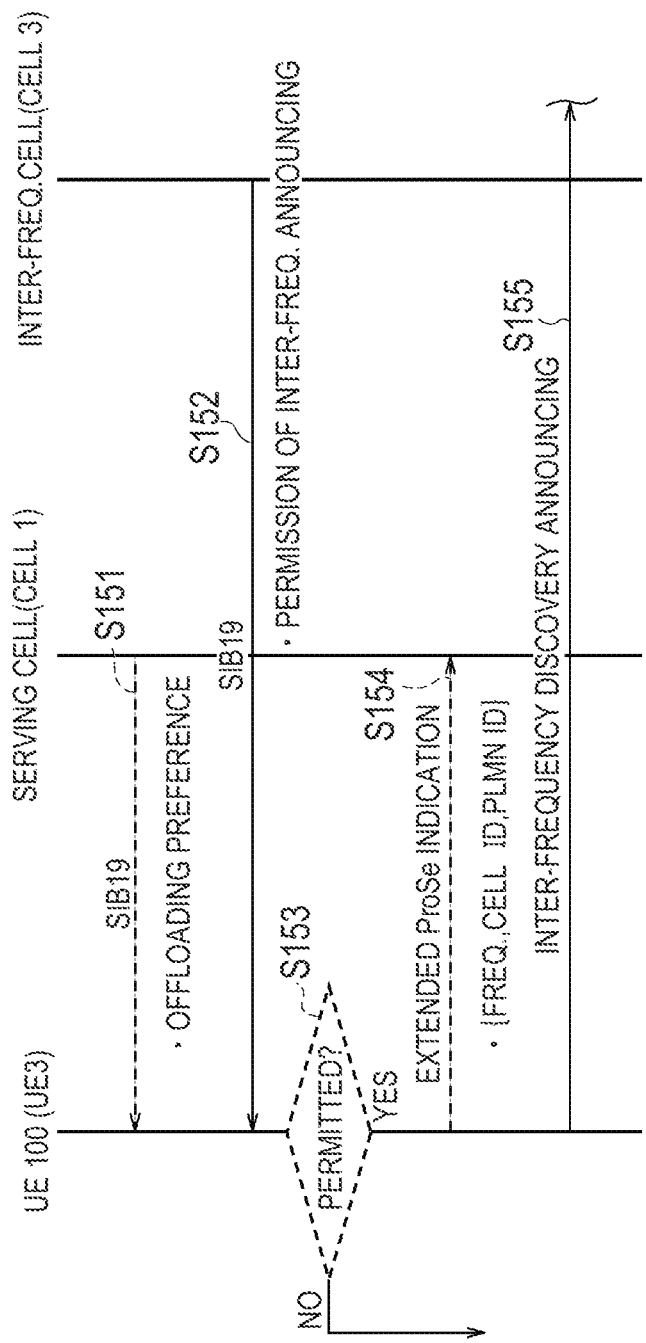
FIG. 10 is a diagram illustrating an example of an operation (second control mode) related to a scenario 3 of the first embodiment.

FIG. 10 is a diagram illustrating an example of an operation (second control mode) related to the scenario 3 of the first embodiment. In FIG. 10, non-essential processes are indicated by broken lines.

As illustrated in FIG. 10, in step S151, the UE 100 (UE 3) receives the SIB 19 from the serving cell (Cell 1). Here, an example in which the SIB 19 includes the "Offloading preference" information is illustrated.

Similarly to the scenario 1, the UE 100 searches for a different frequency and determines whether or not the neighbor cell is able to be detected. In the scenario 3, the neighbor cell (Cell 2) operated at a different frequency is detected.

In step S152, the UE 100 (UE 3) receives the SIB 19 from the detected cell (Cell 3). Here, an example in which the SIB 19 includes permission information for the inter-frequency discovery transmission (permission of inter-freq announcing) is illustrated.

In step S153, the UE 100 (UE 3) determines whether or not the inter-frequency discovery transmission is permitted to the detected cell (Cell 3) on the basis of the permission information. Here, the description will proceed under the assumption that the inter-frequency discovery transmission is permitted. In a case in which the permission information is not included, step S153 may be omitted.

In step S154, the UE 100 (UE 3) may transmit "Extended ProSe Indication" to the serving cell (Cell 1).

In step S155, the UE 100 (UE 3) performs the inter-frequency discovery transmission using the radio resources included in the discovery transmission resource pool (discTxPool) in the SIB 19 received from the neighbor cell (Cell 3) in step S152.

First Modified Example of First Embodiment

In the first embodiment, in a case in which the frequency of the serving cell and the different frequency are frequencies belonging to different PLMNs, the UE 100 may select the second control mode. In other words, the UE 100 applies the second control mode to the inter-PLMN discovery transmission. However, in the case of the inter-PLMN discovery, in a case in which the permission information is not included in the SIB 19, the UE 100 may determine that it is not permitted in step S153 (No) illustrated in FIG. 10.

Further, there may be a rule in which, in the inter-PLMN discovery transmission, when the neighbor cell operated at a different frequency is not detected (in the case of the scenario 1), a notification of "Extended ProSe Indication" (frequency information) is not performed. It is because in the case of the inter-PLMN discovery transmission, it is not preferable to freely use the frequency by control from the serving cell.

Further, for the inter-frequency (inter-PLMN) discovery transmission, a parameter (for example, a range class) may be set in the UE 100 so that transmission power of the discovery signal is lowered in order to suppress interference.

Second Modified Example of First Embodiment

The UE 100 may give a notification of target frequency information indicating a different frequency to be subject to the inter-frequency discovery transmission to the serving cell in accordance with whether or not the inter-frequency discovery transmission has influence on cellular communication (communication with the eNB 200) or in accordance with a capability of the UE 100.

For example, in a case in which the UE 100 includes only one transmitter (specifically, an LTE transmitter), it is difficult for the UE 100 to perform uplink transmission to the eNB 200 and sidelink transmission to another UE 100 at the same time. For this reason, in a case in which the UE 100 includes only one transmitter, the UE 100 gives a notification of the target frequency information indicating a different frequency to be subjected to the inter-frequency discovery transmission to the serving cell. Alternatively, in a case in which the UE 100 includes only one receiver (more specifically, an LTE receiver), the UE 100 may notify the serving cell of the target frequency information.

Even in a case in which the UE 100 includes a plurality of transmitters or a plurality of receivers, the UE 100 may notify the serving cell of the target frequency information when a combination of a D2D frequency and a cellular frequency is restricted. Here, the cellular frequency may be several frequencies in view of the carrier aggregation operation.

Alternatively, the UE 100 may notify the serving cell of the targeting frequency information in a case in which the UE 100 is not able to process both the D2D communication and the cellular communication due to temporary insufficiency in the processing capability of the UE 100. For example, the temporary insufficiency in the processing capability of the UE 100 is, for example, insufficiency in the processing capacity caused by an increase in an operation processing load of an operation device or insufficiency in the processing capacity caused by heat generation of hardware or the like.

Third Modified Example of First Embodiment

The UE 100 may include a measurement result for the reference signal of the neighbor cell as the detection state of the neighbor cell operated at a different frequency in "Extended ProSe Indication." The measurement result for the reference signal of the neighbor cell includes reference signal received power (RSRP) and/or reference signal received quality (RSRQ). The measurement result may be a signal-to-interference noise power ratio (SINR) or a received signal strength indicator (RSSI) in the neighbor cell. In a case in which the UE 100 includes the RSRP/RSRQ in "Extended ProSe Indication", the signaling can be reduced as compared with a case in which the RSRP/RSRQ of the neighbor cell is reported to the eNB 200 through the "Measurement Reporting" procedure. The eNB 200 may set the inter-frequency discovery transmission (or handover) in the UE 100 on the basis of the RSRP/RSRQ of the neighbor cell reported through "Extended ProSe Indication."

Fourth Modified Example of First Embodiment

The eNB 200 may transmit PLMN information indicating whether or not information of a PLMN (a second PLMN) different from a PLMN (a first PLMN) to which the eNB 200 belongs to the UE 100. The information of the different PLMN is, for example, information of discovery resources set in the different PLMN (or a possibility of handover to a cell belonging to the different PLMN). The PLMN information is transmitted to the UE 100 through the SIB or individual signaling. The UE 100 receives the PLMN information from the serving cell. The PLMN information may have a form of a list indicating the presence or absence of information for each of a plurality of "PLMN IDs."

The UE 100 determines information to be included in "Extended ProSe Indication" on the basis of whether or not the serving cell has information of the different PLMN.

Specifically, in a case in which the serving cell has information of the different PLMN, the UE 100 gives a notification indicating the detection state of the neighbor cell operated at a different frequency (or in a different PLMN) to "the serving cell" through "Extended ProSe Indication." Accordingly, the UE 100 is able to receive, for example, the resource allocation information for performing the inter-frequency discovery transmission on the different frequency (or the different PLMN) from the serving cell. Further, when the serving cell has information of the different PLMN, the UE 100 may not receive the SIB 19 of the neighbor cell.

On the other hand, in a case in which the serving cell does not have the information of the different PLMN, the UE 100 gives a notification indicating specific information different from the detection state of the neighbor cell operated at the different frequency (or in the different PLMN) to the serving cell through "Extended ProSe Indication." For example, the specific information is a transmission gap pattern configured with a candidate timing at which the inter-frequency sidelink transmission is performed. For example, the UE 100 decides the transmission gap pattern on the basis of the resource pool information included in the SIB 19 of the neighbor cell. The eNB 200 performs uplink scheduling or the like so that the candidate timing of the inter-frequency sidelink transmission is avoided on the basis of the transmission gap pattern reported from the UE 100.

Second Embodiment

A second embodiment will be described focusing on differences with the first embodiment. The second embodiment is an embodiment related to inter-frequency discovery monitoring.

In the second embodiment, a scenario in which the UE 100 (UE 1) in the scenario 1 illustrated in FIG. 8 performs the inter-frequency discovery monitoring is assumed.

Since the UE 100 (UE 2) and the UE 100 (UE 3) illustrated in FIG. 8 detect the neighbor cell operated at a different frequency, the UE 100 (UE 2) and the UE 100 (UE 3) is able to receive the SIB 19 of the neighbor cell and perform the inter-frequency discovery monitoring using the radio resources included in the discovery reception resource pool in the SIB 19. On the other hand, the UE 100 (UE 1) illustrated in FIG. 8 is not able to perform the inter-frequency discovery monitoring because the UE 100 (UE 1) does not detect the neighbor cell operated at a different frequency.

In the second embodiment, the serving cell (Cell 1) and the neighbor cell (Cell 2 or Cell 3) are assumed to configure the same discovery reception resource pool. In other words, a position (setting) of the discovery reception resource pool in the frequency is similarly set in cells of different frequencies.

Figure 11:
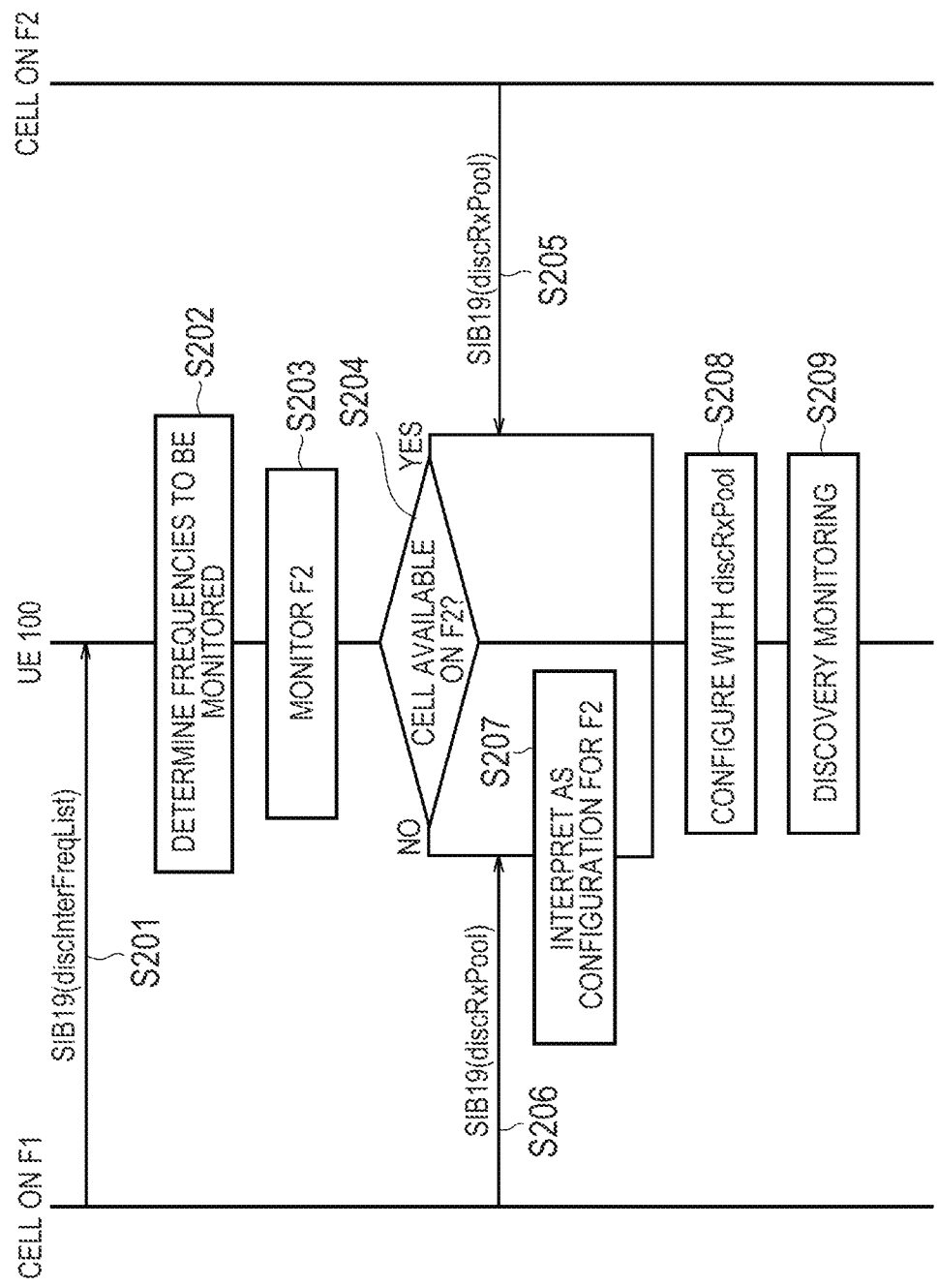
FIG. 11 is a diagram illustrating an example of an operation according to a second embodiment.

FIG. 11 is a diagram illustrating an example of an operation according to the second embodiment. The UE 100 performs the inter-frequency discovery monitoring to monitor the discovery signal transmitted at a frequency (F2) different from a frequency (F1) of the serving cell.

As illustrated in FIG. 11, in step S201, the UE 100 receives the SIB 19 from the serving cell (Cell 1).

In step S202, the UE 100 determines the frequency (F2) at which the inter-frequency discovery monitoring is performed on the basis of "discInterFreqList" in the SIB 19. Alternatively, the frequency (F2) at which the inter-frequency discovery monitoring is performed may be a frequency (pre-configured parameter) written in a universal subscriber identity module card (USIM) of the UE 100.

In step S203, the UE 100 searches for the different frequency (F2) determined in step S202 and determines whether or not the neighbor cell is detected.

The method of detecting the coverage of the neighbor cell is similar to that in the first embodiment. However, in the second embodiment, in a case in which the neighbor cell not transmitting the SIB 19 is detected, the UE 100 may regard that the neighbor cell is not detected. Alternatively, in a case in which the discovery reception resource pool (discRxPool) is not included in the SIB 19 even though a neighbor cell transmitting the SIB 19 is detected, the UE 100 may regard that the neighbor cell is not detected.

In a case in which the neighbor cell operated at the different frequency (F2) is detected (YES in step S204), in step S205, the UE 100 receives the SIB 19 from the neighbor cell operated at the different frequency (F2).

On the other hand, in a case in which the neighbor cell operated at the different frequency (F2) is not detected (NO in step S204), in step S206, the UE 100 receives the SIB 19 from the serving cell. The discovery reception resource pool (discRxPool) in the SIB 19 is originally configured for the frequency of the serving cell, but the UE 100 may regard that the discRxPool is configured for a different frequency. In other words, configuration information is interpreted (step S207).

In step S208, the UE 100 configures the discovery reception resource pool (discRxPool) in the SIB 19.

In step S209, the UE 100 performs the inter-frequency discovery monitoring using the radio resources included in the discovery reception resource pool (discRxPool). In other words, the UE 100 performs the discovery monitoring for the different frequency (F2).

Third Embodiment

A third embodiment will be described focusing on differences with the first embodiment and the second embodiment. The third embodiment is an embodiment related to PLMN selection.

The UE 100 according to the third embodiment includes a NAS entity that performs PLMN selection and an AS entity that performs a PLMN search and notifies the NAS entity of the discovered PLMN. The AS entity notifies the NAS entity of additional information indicating whether or not the discovered PLMN is available for "D2D ProSe." The NAS entity selects a PLMN which is available for "D2D ProSe" in response to a request from an application or the user on the basis of the additional information.

Figure 12:
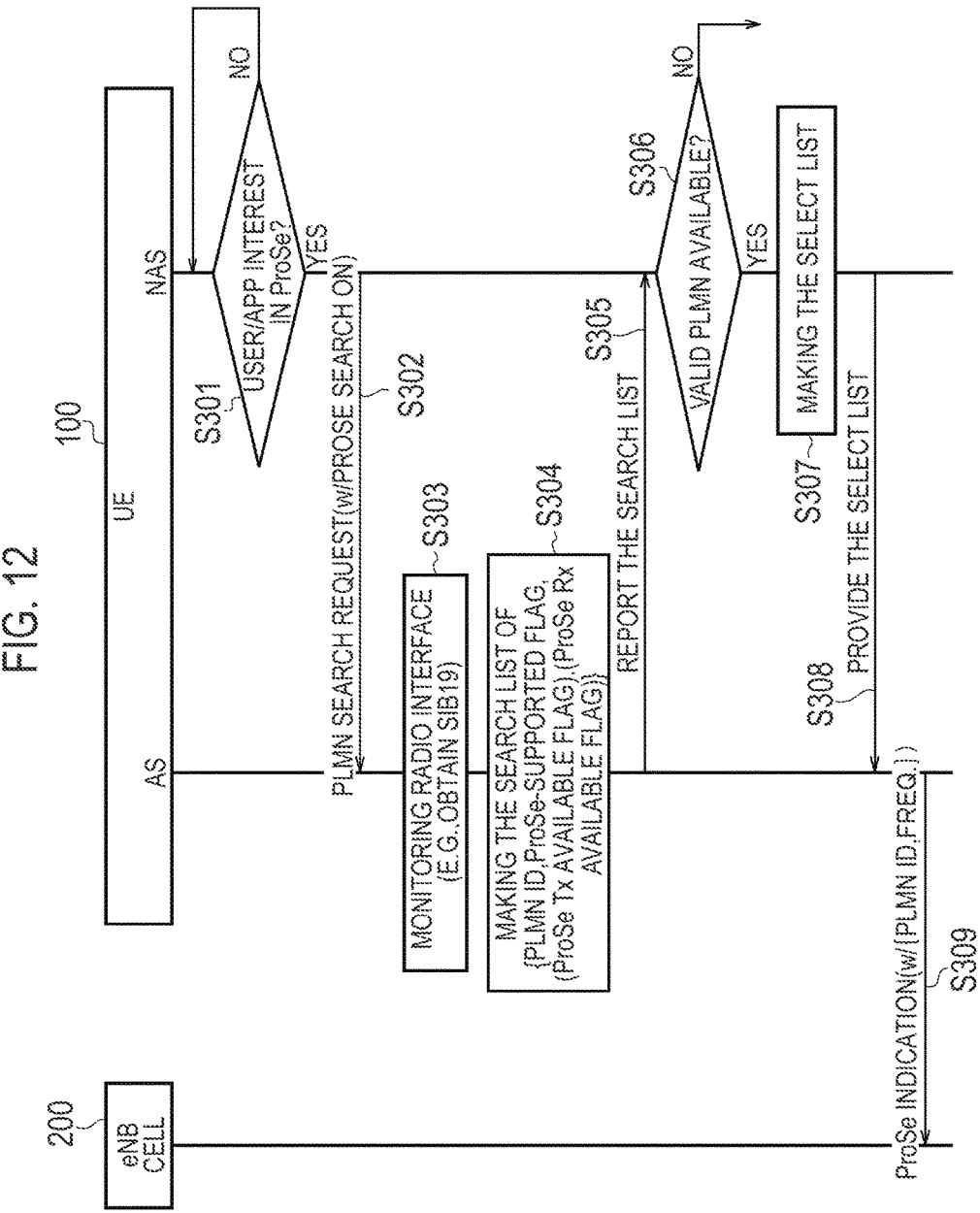
FIG. 12 is a diagram illustrating an operation according to a third embodiment.

FIG. 12 is a diagram illustrating an operation according to the third embodiment. In FIG. 12, the UE 100 is in the RRC idle mode. However, the operation illustrated in FIG. 12 is also applicable even when the UE 100 is in the RRC connected mode.

As illustrated in FIG. 12, in step S301, the NAS entity determines whether or not there is a "D2D ProSe" request from an application or the user. The "D2D ProSe" request may be a request according to a setting (interest information) of the user or an application for the "D2D ProSe" or a request according to manual selection of the user.

In a case in which there is the "D2D ProSe" request from the application or the user (YES in step S301), in step S302, the NAS entity transmits a PLMN search request to the AS entity. The NAS entity includes a ProSe search flag in the request.

In step S303, the AS entity performs the PLMN search when the PLMN search request including the ProSe search flag is received from the NAS entity. For example, the AS entity acquires the SIB 19 of the serving (camp destination) cell, the SIB 19 of the neighbor cell operated by a cell of a different frequency while monitoring a radio environment. The AS entity determines whether or not the "D2D ProSe" is supported in the discovered PLMN on the basis of the SIB 19 or the like. Further, the AS entity may also determine permission of the discovery transmission (the presence or absence of the Tx pool configuration), permission of the discovery monitoring (the presence or absence of the Rx pool configuration), and the like.

In step S304, the AS entity generates a list on the basis of a PLMN search result. For example, the list includes "PLMN ID, ProSe-supported flag, ProSe Tx available flag, and ProSe Rx available flag" for each discovered PLMN. Here, "ProSe-supported flag, ProSe Tx available flag, and ProSe Rx available flag" corresponds to additional information to be reported to the NAS entity. Here, the discovery transmission available flag (ProSe Tx available flag) and the discovery reception available flag (ProSe Rx available flag) are not essential information and may be omitted.

In step S305, the AS entity notifies the NAS entity of the generated PLMN list.

In steps S306 and S307, the NAS entity selects one of PLMNs (ProSe PLMNs) supporting the "D2D ProSe" using the PLMN list with the additional information. In step S306, the process of step S307 may be performed only when a valid PLMN included in the USIM is determined to be discovered. In step S307, for example, the NAS entity presents the discovered ProSe PLMN (to be displayed on the screen) through an application and prompts the user to manually select the discovered ProSe PLMN.

In step S308, the NAS entity notifies the AS entity of the selected PLMN (ProSe PLMN).

In step S309, the AS entity determines implementation of the inter-PLMN discovery transmission/monitoring on the basis of the notification. Alternatively, the AS entity may notify the serving cell of a frequency (PLMN) of interest through "ProSe Indication."

Fourth Embodiment

A fourth embodiment will be described focusing on differences with the first to third embodiments.

In the first to third embodiments, particularly, restriction of access to the neighbor cell is not considered. The fourth embodiment is an embodiment in which restriction of access to the neighbor cell is considered.

Generally, the UE 100 determines whether or not the access restriction is applied to the neighbor cell on the basis of access restriction information for the neighbor cell. The access restriction information may be at least one of "cell-barred" included in the SIB 1, "closed subscriber group (CSG) ID included in the SIB 1" and access class barring (ACB) included in the SIB 2. It is preferable not to perform the inter-frequency discovery transmission for the neighbor cell to which access restriction is applied.

In the fourth embodiment, the eNB 200 manages the serving cell in which the UE 100 performing the inter-frequency discovery transmission exists. The eNB 200 acquires the access restriction information for the neighbor cell operated at the different frequency. The eNB 200 acquires the access restriction information from the UE 100 through "Extended ProSe Indication." Alternatively, the eNB 200 may acquire the access restriction information for the neighbor cell from another eNB managing the neighbor cell via the X2 interface. Alternatively, the eNB 200 may acquire the access restriction information for the neighbor cell from a maintenance monitoring device (OAM).

In a case in which the access restriction is applied to the neighbor cell, the eNB 200 performs control such that the UE 100 does not perform the inter-frequency discovery transmission in the neighbor cell. Specifically, the eNB 200 does not set a transmission resource corresponding to the neighbor cell (or the different frequency) in the UE 100. Therefore, in a case in which the eNB 200 having acquired the access restriction information from another eNB or the OAM performs a setting according to the access restriction information in the UE 100, the UE 100 regards that it is unnecessary to receive the access restriction information for the neighbor cell (or the SIB related to the access restriction information) and does not acquire the information. As a result, the power consumption of the UE 100 can be reduced.

Alternatively, instead of the operation initiated by the eNB 200, the operation may be initiated by the UE 100 as described below.

In the fourth embodiment, the UE 100 performs the inter-frequency discovery transmission of transmitting the discovery signal at the frequency different from the frequency of the serving cell. The UE 100 acquires the access restriction information related to the neighbor cell operated at the different frequency.

In a case in which the access restriction is applied to the neighbor cell, the UE 100 performs control such that the inter-frequency discovery transmission is not performed in the neighbor cell. Specifically, even in a case in which transmission resources for the inter-frequency discovery transmission are set from the serving cell, the UE 100 confirms the SIB 1 and/or the SIB 2 of the neighbor cell to be subjected to the inter-frequency discovery transmission. Then, the UE 100 performs the inter-frequency discovery transmission only when confirming that the access restriction is not applied.

Further, the UE 100 may notify the serving cell of information indicating whether or not the access restriction is applied. The serving cell (eNB 200) may adjust the uplink scheduling in accordance with the notification. The notification may be performed only when the UE 100 includes only one transmitter.

Further, the UE 100 may notify the serving cell of only the frequency of the neighbor cell to which the access restriction is not applied through "Extended ProSe Indication." In other words, the UE 100 does not notify the serving cell of a frequency of a cell to which the access restriction is applied through "Extended ProSe Indication."

Further, another eNB that manages the neighbor cell may stop transmission of D2D transmission resources performed through the SIB 19 (the discovery transmission resource pool (discTxPool) including the radio resources allocated for the discovery transmission or the like) in a case in which the access restriction of UE is performed for the neighboring cell (transmits the SIB 19 including no D2D transmission resources). Here, in addition to the stop of the D2D transmission resources, another eNB may also stop transmission of the reception resource pool (the discovery reception resource pool (discRxPool) including radio resources allocated for the discovery monitoring) (transmits the SIB 19 not including the D2D reception resources). Further, another eNB may stop the transmission of the SIB 19 itself instead of transmitting the SIB 19 not including the D2D transmission resources and/or the D2D reception resources of the SIB 19.

Accordingly, in a case in which the access restriction is applied to the neighbor cell even though the UE 100 does not receive the access restriction information from the serving cell, the UE 100 is able to suppress the inter-frequency discovery transmission according to the reception of the D2D transmission resources by the SIB 19 transmitted from another eNB. Further, in a case in which the UE 100 is instructed to receive the SIB 19 transmitted from the eNB 200 that manages the serving cell (in a case in which the serving cell allocates resources for the inter-frequency discovery to the UE 100), the inter-frequency discovery transmission may be performed.

Fifth Embodiment

A fifth embodiment will be described mainly focusing on differences with the first to fourth embodiments.

In the first embodiment, a situation in which the inter-frequency discovery transmission resources are allocated from both the serving cell and the non-serving cell (neighbor cell) to one the UE 100 is not considered. The fifth embodiment is an embodiment in which this situation is considered.

The UE 100 according to the fifth embodiment performs the inter-frequency discovery transmission of transmitting the discovery signal at the frequency different from the frequency of the serving cell. The UE 100 receives information indicating first radio resources allocated by the serving cell for the inter-frequency discovery transmission and receives information indicating second radio resources allocated by the non-serving cell for the inter-frequency discovery transmission. Here, the non-serving cell may be a neighbor cell belonging to a frequency (non-serving frequency) different from the frequency of the serving cell. Further, the serving cell may be managed by the eNB 200-1, and the non-serving cell may be managed by the eNB 200-2 as illustrated in FIG. 8.

In the fifth embodiment, the first radio resources are dedicated radio resources (dedicated Tx resources) allocated exclusively for the UE 100 by the serving cell. The first radio resources are also referred to as type 2B resources used for the type 2 (specifically type 2B) discovery. For example, the serving cell transmits the first radio resources to the UE 100 through "RRC Connection Reconfiguration" which is dedicated signaling destined for the UE 100.

The second radio resources are common radio resources (common Tx resources) allocated in common to a plurality of UEs 100 by the non-serving cell. The second radio resources are also referred to as type 1 resources used for the type 1 discovery. For example, the non-serving cell transmits the second radio resources to the UE 100 through the SIB 19 which is broadcast signaling.

In the fifth embodiment, in a case in which conflict occurs between the first radio resources and the second radio resources, the UE 100 selects either of the first radio resources and the second radio resources as the radio resources to be used for the inter-frequency discovery transmission. Here, the "conflict" refers to a state in which the first radio resources and the second radio resources are assigned to the same subframe. The "conflict" may be a state in which the first radio resources and the second radio resources are allocated to the same subframe in the same frequency (the non-serving frequency).

In a case in which such conflict occurs, the UE 100 selects either of the first radio resources and the second radio resources on the basis of a predetermined priority. In the fifth embodiment, the predetermined priority is a priority which is pre-configured so that the first radio resources are higher in priority than the second radio resources. Incidentally, the predetermined priority is not limited to the pre-configuration. For example, the UE 100 may configure a predetermined priority transmitted from the eNB 200 together with the first radio resources through "RRC Connection Reconfiguration." In other words, in a case in which conflict occurs between the first radio resources and the second radio resources, the UE 100 selects the first radio resources.

However, if the sidelink gap serving as a period in which the communication with the serving cell is stopped due to the sidelink operation (for example, the sidelink direct discovery, the sidelink direct communication, or the like) is set in the UE 100 by the serving cell, the UE 100 may exceptionally operate as follows. In a case in which the conflict occurs between the first radio resources and the second radio resources, the UE 100 may select the second radio resources in preference to the first radio resources during the sidelink gap. The UE 100 may preferentially select the second radio resources only during the sidelink gaps. The UE 100 gives priority to the first radio resources in periods other than the sidelink gap in principle. Further, in a case in which the predetermined priority is not set, the UE 100 may preferentially select the second radio resources during the sidelink gaps when the sidelink gap is set in the UE 100 by the serving cell, and the conflict occurs between the first radio resources and the second radio resources.

Modified Example of Fifth Embodiment

The predetermined priority may include a priority set for the first radio resources and a priority set for the second radio resources. As this priority, a frequency priority (Cell Reselection Priority) in the cell reselection may be used. For example, a frequency priority corresponding to a frequency in the first radio resources may be set as a priority of the first radio resources, whereas a frequency priority corresponding to a frequency in the second radio resources may be set as a priority of the second radio resources. For example, the "Cell Reselection Priority" is transmitted to the UE 100 through the SIB of the serving cell.

In the present modified example, in a case in which the conflict occurs between the first radio resources and the second radio resources, the UE 100 preferentially selects either of the first radio resources and the second radio resources which is higher in a corresponding priority. In other words, in a case in which a priority corresponding to the non-serving cell is higher than a priority corresponding to the serving cell, the UE 100 preferentially selects the second radio resources. On the other hand, in a case in which the priority corresponding to the serving cell is higher than the priority corresponding to the non-serving cell, the UE 100 preferentially selects the first radio resources. Further, preferentially selecting the radio resources with the higher priority may mean that the radio resources with the higher priority are selected, and the radio resources with the lower priority are not selected.

Other Embodiments

Two or more embodiments of the first to fifth embodiments may be combined and implemented.

The first to fifth embodiments may be applied to "Sidelink Direct Communication." Specifically, the "discovery" in the first embodiment to the fifth embodiment may be replaced with "data."

In the scenarios 1 to 3 of the first embodiment described above, the UE 100 may set (the cell operated at) the frequency F2 as the SCell.

In the first to fifth embodiments, the LTE system has been described as an example of the mobile communication system. However, the present disclosure is not limited to the LTE system. The present disclosure may be applied to systems other than the LTE system.

[Additional Note 1]

(Introduction)

The new work item on Enhanced LTE Device to Device Proximity Services was approved. One of the objectives in this WI is; 3) Enhance D2D discovery support in the presence of multiple carriers and PLMNs: a) Allow D2D transmissions in a non-serving carrier and/or secondary cell belonging to the same and possibly different PLMN as the serving cell.

In this additional note, it is discussed to optimize ProSe discovery mechanism for more efficient inter-frequency and inter-PLMN operations from both announcing and monitoring perspectives.

(Discovery Announcing Aspects)

(Scenarios for Inter-Frequency Discovery Announcing)

In Rel-12 the discovery announcing was allowed only on its serving cell, while the possibility in Rel-13 to use the other frequencies than the serving cell was suggested. In Rel-13 it is expected to optimize Rel-12 mechanism under multi-carrier deployment. For example in Rel-12, since the resource pools are statically configured by OAM, when the serving cell does not have enough Tx resources, it needs to perform handover the UEs interested in discovery announcing to the other frequencies. Such increased handover may cause unnecessary signalling and potential handover failures. Furthermore, if the UE does not detect any neighbour cells, handover is not even an option for the serving cell. Therefore, in Rel-13 a more flexible scheme to allow the inter-frequency discovery announcing with camping on the serving frequency should be considered. Furthermore, since the discovery announcing is already allowed in both idle and connected modes, the Rel-13 mechanism should also follow the same principle.

Proposal 1: Inter-frequency discovery announcing in both idle and connected modes should be supported in Rel-13.

Today, some complex deployments should be taken into consideration. These deployments include the multi-carrier deployment for hot spot capacity enhancements and the heterogeneous network with macro layers and small cell layers. As depicted in FIG. 8, there could be three essential scenarios for inter-frequency discovery announcing from the UE's perspective;

Scenario 1: The UE which camps on F1 is not aware of any F2 coverage (i.e., there are no synchronization and control channel available in F2).

In this scenario, it may be possible that the radio resource allocations for discovery announcing on F2 are performed while the UE is camped on F1 of cell 1, as long as the UL interference to the neighbour cells operating on F2 is under control by means of e.g., appropriate Range Class, frequency planning and/or deployment policy. The resource allocation may be performed as the cross-carrier resource allocation for both Type 1 and Type 2B discovery. It is FFS how the discovery monitoring is performed on F2.

Scenario 2: The UE which camps on F1 is aware of F2 coverage provided by the same eNB.

In this scenario, the interference to Uu uplink on F2 should be considered when inter-frequency discovery announcing is performed. Since F2 is controlled by the same eNB for Cell 2, the discovery resource for announcing in F2 may be coordinated by the eNB to avoid Uu uplink interference on F2.

Scenario 3: The UE which camps on F1 is aware of F2 coverage provided by different eNB.

This scenario is similar to the scenario 2, but the coverage on F2 is provided by different eNB from the eNB which the UE camps on. So, the interference issue is more significant than in scenario 2. Therefore, the Tx resources for inter-frequency discovery announcing should follow the configuration provided by the cell 2 operated on F2. Since the UE is still camping on the cell 1 on F1, the UE may perform Type 1 discovery according to Tx resource pool provided in SIB19 of F2.

Proposal 2: When the UE is not aware of any coverage on the other frequency, the serving cell should control the resource allocation for inter-frequency discovery announcing.

Proposal 3: When the UE is aware of the coverage on the other frequency, the eNB which serves the neighbour cell operated on the frequency should control the resource allocation for inter-frequency discovery announcing.

Table 1 shows Resource allocation on each scenario.

(Additional Procedures for Inter-Frequency Discovery Announcing)

For initiation of the inter-frequency discovery announcing, the serving cell should know whether the concerned UE is aware of cells on the other frequency, i.e., scenario 1 or scenario 2. If there is no coverage around the UE in F2 (i.e., scenario 1) or the UE detects the cell belonging to the same eNB operating the serving cell (i.e., scenario 2), the serving cell should configure the UE with appropriate parameters for inter-frequency discovery announcing. It could be considered that the serving cell reuses the existing measurement report triggering, e.g., the serving cell may implicitly know there is no coverage for the UE on F2 when no measurement report is triggered.

Observation 1: The serving cell may reuse the existing measurement report triggering in order to know whether the UE is aware of coverage in the other frequency.

As discussed in section 0, the inter-frequency discovery announcement is possible even if there is no coverage on the other frequency. In such case, the serving cell allocates the resources by means of cross-carrier resource allocation. Regardless of discovery type (i.e., Type 1 or Type 2B), the serving cell should provide the frequency indicator in SL-DiscConfig on RRCConnectionReconfiguration. It's FFS whether SIB19 may also provide the Tx resource pool of the other frequencies.

The serving cell should indicate the frequency corresponding to the resource allocation in dedicated signalling for Scenario 1.

In case that the UE is aware of the coverage on the other frequency which is provided by the other eNB (i.e., scenario 3), the UE should follow the Tx resource pool provided in SIB19 of non-serving cell. Since the UE can obtain the SIB19 on the other frequencies as defined in Rel-12 discovery monitoring, there's no reason to limit the discovery announcing on non-serving frequency, if the UE is authorized by the NW.

Proposal 5: The UE should be allowed to perform Type 1 discovery announcing provided in SIB19 by cells belonging to other frequencies.

In case the UE detects a cell belonging to a different eNB (i.e., scenario 3) and wants to transmit on this cell, the UE will just follow the configuration provided by SIB19 provided by this eNB since the UE's serving cell should not control the radio resources on F2. Depending of number of separate discovery messages (i.e., the resources for discovery announcement the UE wants), the UE will need to decide whether to use the Type 1 Tx resources on F2, If the UE decide to use the resources on F2 but it has a single transmitter, the prioritization between Uu UL on F1 and

TABLE 1

| | Scenario 1 | Scenario 2 | Scenario 3 |
| --- | --- | --- | --- |
| Conditions | UE 1 does not detect any cell on F2. | UE 2 detects coverage on F2 which is provided by the same eNB with the serving cell. | UE 3 detects coverage on F2 which is provided by different eNB from the serving cell. |
| Responsibility of resource allocation | Serving cell. | Neighbour cell or serving cell. | Neighbour cell. |
| Discovery type | Type 1 and Type 2B. | Type 1 if neighbour cell has responsibility. Type 1 or Type 2B if serving cell has responsibility. | Type 1. | discovery announcement on F2 should be decided by the serving cell. So, the serving cell should take care of the scheduling on Uu to ensure the UE discovery announcement opportunities. Since the serving cell does not know the UE's interest in discovery announcing on F2, the UE should inform the serving cell of the intended frequency(ies). The information may be included in the SidelinkUEInformation and the frequencies may be based on SL-CarrierFreqInfoList in SIB19 of the serving cell. In addition, the serving cell may need to be informed of the detailed ProSe configuration (i.e., discTxPoolCommon or at least time pattern of Tx pool) of different eNB(s) by means of e.g., SidelinkUEInformation, inter-eNB information exchange over X2 or OAM in order for the serving cell to coordinates resource allocations for Uu UL, e.g., discovery announcement gap.

Proposal 6: The UE should inform the serving cell of its intended frequencies for inter-frequency discovery announcing.

Proposal 7: The serving cell should be informed of the Tx resource pool(s) configured by different eNB.

(Inter-PLMN Discovery Announcing)

The inter-PLMN discovery announcing is a special case of scenario 3 in FIG. 8. Therefore, if Proposal 5 is acceptable, it's technically possible to support the same scheme in inter-PLMN discovery announcing as long as the UE is authorized by the NW. However, it may cause some issues such as fairness of loads among PLMNs, further discussion may be needed.

Observation 2: Inter-PLMN discovery announcing could be possible with Type 1 configured by SIB19 of the other PLMN.

(Discovery Monitoring Aspects)

In Rel-12, there was a conflict regarding the sidelink gap between the agreements in RAN2 and RAN1, and RAN2 decided to stick to their previous agreement;

DISCOVERY [ . . . ] 3 Sidelink gap is not supported (RAN1 agreement is reverted)

This agreement was quite reasonable assuming best-effort assumption and successfully contributed to Rel-12 WI completion. However, since Rel-13 WI assumes multi-carrier operation, the discovery mechanism will face more difficulty in satisfying the need for "number of devices discovered" which was evaluated in Rel-12 study. RAN2 should also keep in mind that for UEs with single Rx RAN1 has previously agreed that it's too difficult to ensure a moderate discovery performance even in intra-frequency case let alone for such UEs to support the inter-frequency/PLMN case.

Observation 3: With multi-carrier operation, best-effort assumption on discovery may not work well.

In order to optimize the discovery mechanism for multi-carrier operation, the additional gaps for inter-frequency and inter-PLMN discovery monitoring should be revisited in Rel-13.

Proposal 8: Sidelink gaps for inter-frequency/inter-PLMN discovery monitoring should be supported in Rel-13.

[Additional Note 2]

(Conflict of Resource Allocations on the Other Frequency)

In scenario 2, the UE may read the SIB19 of non-serving cell (e.g., Type 1 resources) and be configured by the serving cell (e.g., Type 2B resources) simultaneously. In Rel-12, the resources in SIB19 and dedicated signalling were exclusively used depending on whether the UE is in idle or connected, and also the UE should select a Tx resource pool from the multiple Tx resource pools by RSRP-based or random manner [5]. In Rel-13 with inter-frequency discovery announcement, it should be discussed whether it is allowed to use both resources provided by the serving cell and non-serving cell, or which resource is prioritized. From flexibility of discovery point of view, it is preferable that the UE is allowed to use both resources.

Proposal 8: RAN2 should discuss whether the UE is allowed to use both Type 1 and Type 2B resources for another frequency whereby the Type 2B resource is configured by its serving cell in the serving frequency.

(Access Restrictions in the Other Frequency Cell)

Additional issues could be seen in the case the serving cell configures the UE with discovery resources for announcing on the other frequency. Currently SIB1 may include two sets of access restriction parameters, i.e., cell-barred and closed subscriber group (CSG). In addition, SIB2 may contain the parameter set for access class barring, ACB [5]. If the UE is restricted from accessing the cell on the other frequency, it's questionable whether the UE is allowed to transmit discovery signal on the cell even if the Tx resource on the other frequency has been configured by the serving cell. It seems natural that the UE should not be allowed to perform discovery announcing in this situation.

Proposal 9: RAN2 should discuss whether the UE is allowed to perform discovery announcing on the other frequency, when it is restricted from accessing the cell on that frequency.

If Proposal 9 is an issue, i.e., the UE is not allowed to perform discovery announcing when the cell offers access restriction, the serving cell in Scenario 2 has the knowledge whether non-serving cell on another frequency is currently restricted or not since the cells are belonging to the same eNB.

From the UE behaviour's perspective, the UE should assume that if the serving cell provides resources for the other cell it may use the resources regardless of the access restriction on the other cell.

Proposal 10: The UE is allowed to use discovery resources configured by its serving cell for another cell on a different frequency regardless of the access restriction on the other cell.

However the same principle cannot be applied to Scenario 3 where the other frequency's cell belongs to a different eNB. In case inter-eNB cross-carrier resource allocation is permitted which is contradictory to the principle in Proposal 3, the serving cell may not know the restriction in the other eNB.

Proposal 11: Inter-eNB cross-carrier resource allocation should not be allowed.

Regardless of whether Proposal 10 is acceptable, the two alternatives could be considered as follows;

Alternative 1: The Serving Cell to Avoid Configuration Corresponding to that Cell In this alternative, the serving cell should avoid to configure the UE to transmit discovery signals on the other frequency, i.e., the UE is not provided any Tx resources for inter-frequency discovery announcement. So, The UE is always allowed to perform discovery announcement on the other frequency when the configuration is provided. Additionally if Proposal 10 is not acceptable, i.e., inter-eNB cross-carrier resource allocation is allowed, the eNB operating the serving cell needs to know whether the cell on the other frequency belonging to the other eNB offers access restriction. So, it may be informed by means of e.g., SidelinkUEInformation, inter-eNB information exchange over X2 or OAM.

Alternative 2: The UE to Avoid Discovery Announcing on that Cell

The UE is not allowed to perform discovery announcing on the cell which restricts the access, even if the configuration (i.e., Tx resources) is provided by the serving cell. The UE always needs to check SIB1 and SIB2 before discovery announcing, to confirm whether the access is not restricted. It could be additionally considered for a single transmitter UE that it may inform the serving cell of its restriction applicability on that cell, to assist the Uu scheduling (i.e., the discovery announcing is no longer need to be considered in the serving cell).

With Alternative 1, the NW will ensure that there is no access restriction on the other frequency cell when resources are configured by the serving cell. However, this may increase the complexity in the NW for such coordination. With Alternative 2 UE power consumption and complexity will be increased and it may also need to define a new behaviour for the UE to refrain from using resources configured by its serving cell. From the UE perspective, Alternative 2 is simpler and preferable solution.

Proposal 12: The serving cell should ensure there is no access restriction of the other frequency cells, regardless of whether cross-carrier allocation of discovery resource between eNBs is allowed.

[Additional Note 3]
(Introduction)

The initial discussion on Rel-13 eD2D was started and achieved the agreement for inter-PLMN discovery as follows [1];

Inter-PLMN scenario
SA2 guidance may be required on whether inter-PLMN authorization for discovery transmission can be handled by higher layer
With Network Infrastructure
If the network has inter-PLMN information then the network should have the option to configure the UE similar to the intra-PLMN case
We cannot assume that inter-PLMN coordination is always possible. The baseline scenario to consider is uncoordinated inter-PLMN.
For uncoordinated inter-PLMN scenarios with network infrastructure, the UE reads SIB19 of the concerned carrier frequency to learn the tx/rx resource pool to use. FFS how the carrier frequency is configured in the UE.
Without Network Infrastructure
The inter-PLMN scenario without network infrastructure (e.g. no eNB in the ProSe carrier) will be supported, assuming that out-of-coverage discovery is supported.

In this additional note, it is discussed to optimize ProSe discovery mechanism for more efficient inter-PLMN operations from both announcing and monitoring perspectives.

(Discovery Announcing Aspects)
Assumptions Built on the Agreements

Figure 13:
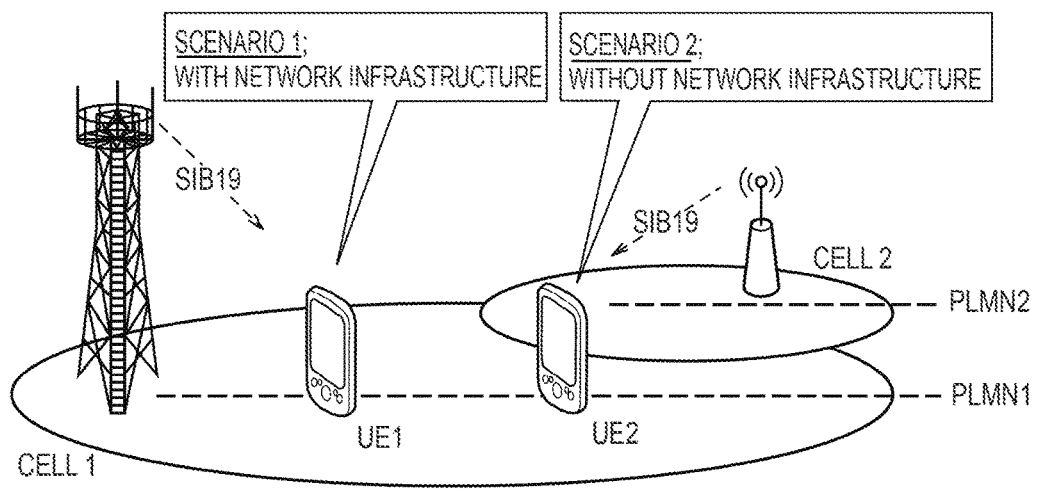
FIG. 13 is a diagram illustrating scenarios for inter-frequency discovery announcing according to additional notes.

The two scenarios are agreed as illustrated in FIG. 13, i.e., with/without network infrastructure. For the scenario with network infrastructure, the baseline scenario to consider is uncoordinated inter-PLMN, and it was clarified that the "uncoordinated" means an eNB did not know the configuration of the other eNB belonging to the other PLMN. In addition to the configuration aspects, it should not be assumed that there is no synchronization between PLMNs.

Proposal 1: There is no synchronization between PLMNs under the uncoordinated inter-PLMN scenario.

A FFS is captured in the agreement on how the carrier frequency is configured in the UE, in order to acquire SIB19 to learn Tx/Rx resource pools. According to Rel-12 specification, it is clear that the serving cell may provide in SIB 19 a list of frequencies along with PLMN ID on which the UE may aim to monitor discovery message. In addition, the ProSe Direct Discovery authorization (non-Public Safety UE) contains;

2) ProSe Direct Discovery announcing authorisation policy:
PLMNs in which the UE is authorized to perform announcing.
Authorised discovery range for announcing per PLMN.
So, there is no carrier frequency information in the authorization. It could be understood that it's up to E-UTRAN which carrier(s) is used within a (authorized) PLMN.

Proposal 2: The serving cell may indicate the UE of the carrier frequency of different PLMN as is Rel-12.

(Additional Procedures for Inter-PLMN Discovery Announcing)

For initiation of the inter-PLMN discovery announcing, the serving cell should know whether the concerned UE is aware of cells on the other PLMN. If there is no coverage around the UE in PLMN2 (i.e., scenario 1), the UE may use pre-configured parameters. If the UE detects the cell belonging to the other PLMN (i.e., scenario 2) but under the uncoordinated inter-PLMN scenario, the UE reads SIB19 of the concerned carrier frequency to learn the tx/rx resource pool to use. Else, if the UE detects the cell belonging to the other PLMN (i.e., scenario 2) and the serving cell has inter-PLMN information, the network should have the option to configure the UE similar to the intra-PLMN case. For each scenario, there are two important points to define the NW/UE behaviour, whether the UE is in-coverage of the other PLMN or not, and whether the serving cell has inter-PLMN information or not.

(The UE is In-Coverage/Out-Of-Coverage on the Other PLMN)

It's a question whether the serving cell should determine whether the UE is now in-coverage of the other PLMN or not, while of course the UE knows it. If the serving cell should determine, the UE needs to inform the serving cell of the condition with e.g., the existing measurement reporting. However, it may cause more signalling overhead due to additional iterations. For example, under the coordinated inter-PLMN scenario (i.e., assuming the serving cell has inter-PLMN information), the UE informs the serving cell of the its interest in inter-PLMN discovery announcing first, the serving cell configure the UE with inter-PLMN RRM measurement, the UE sends the measurement report, and then the serving cell provides inter-PLMN discovery configuration, i.e., four iterations are needed.

On the other hand, if the serving cell does not need to determine (i.e., the UE has the responsibility to determine whether it's in-coverage or not), The procedure will be simpler with two iterations such that the UE informs the serving cell that it's "in-coverage" of the other PLMN of interest, and the serving cell performs inter-PLMN discovery configuration. So, the UE should have the responsibility to determine whether it's in-coverage of the other PLMN or not.

Proposal 3: The UE has the responsibility to determine whether it's in-coverage of the other PLMN of interest or not.

Proposal 4: For the coordinated inter-PLMN scenario, the UE should inform the serving cell of its condition whether it is "in-coverage" of the PLMN of interest.

RAN2 agreed that the baseline scenario to consider is uncoordinated inter-PLMN. In the uncoordinated scenario, the UE may use Tx resources provided by SIB19 of the other PLMN (in-coverage). On the other hand, the UE may use Tx resources provided by pre-configuration when it is out-of-coverage on the other PLMN of interest. Regardless of the Tx resources to be used, the serving cell should take into account the occasion of inter-PLMN discovery announcing in the Uu scheduling. However, the serving cell does not know the inter-PLMN configurations, i.e., under the uncoordinated scenario or use of pre-configured parameters. So, the serving cell should be informed from the UE of the configurations. It could be considered two alternatives;

Alternative 1: The UE forwards SIB19 of the other PLMN. It may need additional information of time difference between PLMNs.

Alternative 2: The UE informs of a "gap pattern" based on the Tx resource pool(s). The "gap pattern" may be able to align the time difference with the serving cell in the UE.

The alternatives essentially have the same functionality. However, the signalling overhead is different and obviously Alternative 1 needs more bits to inform of the configuration. So, Alternative 2 is preferable.

Proposal 5: The serving cell should be informed from the UE of a "gap pattern" for the purpose of Uu scheduling.

It's natural to inform of the "in-coverage" and "gap pattern" over SidelinkUEInformation, since no reason could not be seen to define new RRC message or to extend the other signalling, e.g., the measurement reporting.

Proposal 6: The SidelinkUEInformation should be extended to inform the serving cell of additional information for inter-PLMN discovery announcing.

(The Serving Cell has/does not have Inter-PLMN Information)

The serving cell may not need to inform the UE of inter-PLMN information availability, if the SidelinkUEInformation is allowed to be transmitted with full information, i.e, both "in-coverage" and "gap pattern", as long as SIB19 is provided. This is simple and minimizes the standard impacts.

However, it's obvious that the "in-coverage" and "gap pattern" will be used exclusively in the serving cell. For example with uncoordinated inter-PLMN, the serving cell may take the "gap pattern" information into its Uu scheduling as discussed in section 2.2.1, but the "in-coverage" condition is not useful because the serving cell anyway does not care whether the UE uses Tx resources from SIB19 of the other PLMN or pre-configuration (i.e., in-coverage or out-of-coverage). So, the "in-coverage"/"gap pattern" should be informed exclusively in order to reduce unnecessary overhead. In addition, the exclusive information may reduce the UE power consumption, e.g., no need to read SIB19 when only "in-coverage" should be informed.

So, it is useful that serving cell provide its inter-PLMN information availability (i.e., whether coordinated or uncoordinated inter-PLMN scenario) in e.g., SIB19. The UE should choice the contents in SidelinkUEInformation according to the additional information provisioned.

Proposal 7 The serving cell should provide its inter-PLMN information availability.

[Additional Note 4]

(Conflict of Resource Allocations on the Other Frequency)

The following agreements were reached;

Agreements

For intra-PLMN and inter-PLMN, the serving eNB will signal which frequencies and PLMN the discovery transmissions are allowed to be performed. The UE can read SIB19 of the other carriers to acquire the resources for direct discovery transmission.

For intra-PLMN or coordinated inter-PLMN, the serving eNB can provide direct discovery resource information for other carriers using dedicated signalling or broadcast signalling.

According to the two agreements, the UE is allowed to read the SIB19 of non-serving cell (e.g., Type 1 Tx resources) and also be configured by the serving cell (e.g., Type 2B Tx resources), and it's possible both resource allocations are available simultaneously. In Rel-12, the resources in SIB19 and dedicated signalling were exclusively used depending on whether the UE is in idle or connected, and also the UE should select a Tx resource pool from the multiple Tx resource pools by RSRP-based or random manner. In Rel-13 with inter-frequency discovery announcement, it should be discussed whether it is allowed to use both resources provided by the serving cell and non-serving cell, or which resource is prioritized. From flexibility of discovery point of view, it is preferable that the UE is allowed to use both resources.

Proposal 1: RAN2 should discuss whether the UE is allowed to use both Type 1 and Type 2B resources for another frequency whereby the Type 2B resource is configured by its serving cell in the serving frequency.

If Proposal 1 is agreeable, another issue that requires further discussion is for the case of unsynchronized intra-PLMN and inter-PLMN, i.e., SFN is not aligned among frequencies belonging to different PLMNs. In this situation, it is likely that the same subframe(s) is simultaneously configured with Tx discovery resources from both the serving cell and the non-serving cell on another frequency. Considering the UE with a single Tx chain, the conflict may be resolved by the following options;

Option 1: It is up to UE implementation how and when the UE announces on either frequency.

Option 2: The UE always prioritizes the dedicated Tx resources (e.g., Type 2B) over the common Tx resources (e.g., Type 1).

Option 3: The serving cell allocates the sidelink gap and the UE is only allowed to prioritize common Tx resources on the non-serving frequency during the sidelink gap.

Option 1 is the simplest solution from the standardization point of view. With Option 2, the spectral efficiency can be improved since the common Tx resources may be used by the other UEs even if a UE cannot perform discovery announcement due to the conflict. Option 3 can facilitate NW-controlled mechanism, i.e., it's up to the serving cell whether to allocate the sidelink gap or not. Since the usage of radio resource should be managed by the serving cell as much as possible, Option 2 or Option 3 would be preferable over Option 1. It may also be considered if a combination of these options could be considered, i.e., if the sidelink gap (Option 3) is not configured then the UE prioritizes dedicated Tx resources over common Tx resources (Option 2).

Proposal 2: RAN2 should discuss whether the conflict of Tx resources within the same subframe(s) should be solved by a prioritization rule and/or the sidelink gap.

[Additional Note 5]

In the case the serving cell configures the UE with discovery resources for announcing on another frequency, there's a possibility of access restriction from the cell belonging to that frequency. Currently SIB1 may include two sets of access restriction parameters, i.e., the cell-barred and the closed subscriber group (CSG) [3]. In addition, SIB2 may contain the parameter set for access class barring, ACB [3]. If the UE is restricted from accessing the cell on the other frequency, it's questionable whether the UE is allowed to transmit discovery signal on the cell even if the Tx resource on the other frequency has been configured by the serving cell. It seems natural that the UE should not be allowed to perform discovery announcing in this situation. Note that this issue may be avoided in the case the UE is indicated to autonomously read SIB19 of the other frequency, by means of e.g., the cell on the other frequency reconfigures its own SIB19 not to provide any transmission resources when it decides the access restriction.

Proposal 1: RAN2 should discuss whether the UE is allowed to perform discovery announcing on another frequency, when it is restricted from accessing the cell on that frequency.

If Proposal 1 is an issue, i.e., the UE is not allowed to perform discovery announcing when the cell offers access restriction, two alternatives may be considered:

Alternative 1: The Serving Cell Avoids Configuration of Tx Resources Corresponding to the Inter-Frequency Cell In this alternative, the serving cell should avoid to configure the UE to transmit discovery signals on the other frequency, i.e., the UE is not provided any Tx resources for inter-frequency discovery announcement. So, the UE is always allowed to perform discovery announcement on the other frequency when the configuration is provided. From the serving cell perspective, the serving cell needs to be informed whether the other cell operating on a non-serving frequency is experiencing access restriction. The serving cell may be informed of the access restriction status and/or the discovery resource configuration in the other cell via SidelinkUEInformation, inter-eNB information exchange over X2 or OAM.

Alternative 2: The UE Avoids Discovery Announcing on the Inter-Frequency Cell

The UE is not allowed to perform discovery announcing on the cell which restricts access, even if the configuration (i.e., Tx resources) is provided by the serving cell. The UE is required to check SIB1 and SIB2 before discovery announcing, to determine the status of the cell's access restriction. Additionally, for a single transmitter UE, it should be further considered whether the UE should inform the serving cell of the access restriction of the inter-frequency cell, to assist the serving cell with Uu scheduling (i.e., the discovery announcing on the inter-frequency cell is no longer needed).

With Alternative 1, the NW will ensure that there is no access restriction on the other frequency cell when resources are configured by the serving cell. However, the coordination may increase network complexity. With Alternative 2 UE power consumption and complexity will be increased and a new UE behaviour may be required if the UE is to refrain from using resources configured by its serving cell. Since RAN2 agreed that the serving eNB can provide direct discovery resource information for other carriers using dedicated signalling or broadcast signalling, in order to reduce the UE power consumption associated with the monitoring of control signalling on the other frequency, Alternative 1 is the preferable solution.

Proposal 2: The serving cell should ensure there is no access restriction on the other cell before it provides direct discovery resource information for the frequency belonging to the other cell.

The invention claimed is:

1. A radio terminal, comprising:
a transmitter configured to perform inter-frequency sidelink discovery transmission of transmitting a sidelink discovery signal at a frequency different from a frequency of a serving cell;
a receiver configured to receive a system information block including information indicating whether the inter-frequency sidelink discovery transmission is allowed for each frequency; and
a controller configured to determine, based on the system information block, a frequency for which the inter-frequency sidelink discovery transmission is allowed, wherein
based on result of the determination, the transmitter is further configured to transmit, to the serving cell, a message including information that requests allocation of radio resources used by the radio terminal to perform the inter-frequency sidelink discovery transmission.

2. The radio terminal according to claim 1, wherein
the receiver is further configured to receive, from the serving cell, resource information indicating the radio resources allocated to the radio terminal, and
the transmitter is configured to perform the inter-frequency sidelink discovery transmission based on the resource information.

3. A method performed at a radio terminal configured to perform inter-frequency sidelink discovery transmission of transmitting a sidelink discovery signal at a frequency different from a frequency of a serving cell, the method comprising:
receiving a system information block including information indicating whether the inter-frequency sidelink discovery transmission is allowed for each frequency; and
determining, based on the system information block, a frequency for which the inter-frequency sidelink discovery transmission is allowed; and
transmitting, based on result of the determination, to the serving cell, a message including information that requests allocation of radio resources used by the radio terminal to perform the inter-frequency sidelink discovery transmission.

4. A processor provided in a radio terminal configured to perform inter-frequency sidelink discovery transmission of transmitting a sidelink discovery signal at a frequency different from a frequency of a serving cell, the processor configured to execute processes of:
receiving a system information block including information indicating whether the inter-frequency sidelink discovery transmission is allowed for each frequency; and
determining, based on the system information block, a frequency for which the inter-frequency sidelink discovery transmission is allowed; and
transmitting, based on result of the determination, to the serving cell, a message including information that requests allocation of radio resources used by the radio terminal to perform the inter-frequency sidelink discovery transmission.

* * * * *